US012600609B2

(12) United States Patent
Diaz, Jr. et al.

(10) Patent No.: US 12,600,609 B2
(45) Date of Patent: Apr. 14, 2026

(54) HOSE SUPPORTS FOR FACILITATING THE ASSEMBLY OF MASTS FOR MATERIAL HANDLING VEHICLES AND RELATED METHODS

(71) Applicant: Mitsubishi Logisnext Americas Inc., Houston, TX (US)

(72) Inventors: Victor M. Diaz, Jr., Schaumburg, IL (US); Mark McGee, Marengo, IL (US); Hidekazu Yasukochi, North Las Vegas, NV (US)

(73) Assignee: Mitsubishi Logisnext Americas Inc., Houston, TX (US)

( * ) Notice: Subject to any disclaimer, the term of this patent is extended or adjusted under 35 U.S.C. 154(b) by 28 days.

(21) Appl. No.: 18/919,298

(22) Filed: Oct. 17, 2024

(65) Prior Publication Data

US 2025/0388445 A1 Dec. 25, 2025

Related U.S. Application Data

(60) Provisional application No. 63/662,387, filed on Jun. 20, 2024, provisional application No. 63/662,392, (Continued)

(51) Int. Cl.
*B66F 9/08* (2006.01)
*B66F 9/22* (2006.01)

(52) U.S. Cl.
CPC . *B66F 9/08* (2013.01); *B66F 9/22* (2013.01)

(58) Field of Classification Search
CPC .... B66F 9/08; B66F 9/20; B66F 9/205; B66F 9/22
See application file for complete search history.

(56) References Cited

U.S. PATENT DOCUMENTS 2,791,293 A * 5/1957 Schenkelberger ...... B66F 9/205 414/918
3,075,732 A * 1/1963 Lindenmeyer ........ E02F 9/2275 191/12 C (Continued)

FOREIGN PATENT DOCUMENTS

CN 110255448 9/2019
CN 111704081 9/2020

(Continued)

OTHER PUBLICATIONS

International Search Report and Written Opinion for Application No. PCT/US2024/052251, mailed Dec. 27, 2024, 11 pages.

(Continued)

*Primary Examiner* — Minh Truong
(74) *Attorney, Agent, or Firm* — Norton Rose Fulbright US LLP

(57) ABSTRACT

This disclosure includes hose supports for masts of material handling vehicles and methods of using the same. Some hose supports include a lower linear portion having a length, an upper linear portion that has a length larger than the length of the lower linear portion and is angularly disposed relative to the lower linear portion, a lower bracket configured to couple the lower linear portion to a mast, and an upper bracket configured to couple the upper linear portion to the mast, wherein the lower bracket and/or the upper bracket each define a slot extending in a first direction that is parallel to the length of the lower linear portion and/or openings spaced apart from one another in the first direction, each of the slot(s) and/or openings configured to receive a fastener for coupling the hose support to the mast.

19 Claims, 26 Drawing Sheets

Related U.S. Application Data filed on Jun. 20, 2024, provisional application No. 63/662,390, filed on Jun. 20, 2024, provisional application No. 63/662,388, filed on Jun. 20, 2024.

(56) References Cited

U.S. PATENT DOCUMENTS

| | | | | | |
|---|---|---|---|---|---|
| 3,394,778 | A | | 7/1968 | Brinton | |
| 3,484,964 | A | | 12/1969 | Jeffery | |
| 4,092,997 | A | * | 6/1978 | Hansen | H02G 11/00 174/69 |
| 4,266,744 | A | * | 5/1981 | Bergman | B66F 9/205 187/228 |
| 4,356,891 | A | | 11/1982 | Bartow | |
| 4,449,614 | A | | 5/1984 | Matsuda | |
| 4,503,936 | A | * | 3/1985 | Rice | B66F 9/205 414/631 |
| 4,585,093 | A | | 4/1986 | Barda, Jr. | |
| 5,328,321 | A | | 7/1994 | Moffett et al. | |
| 5,370,494 | A | | 12/1994 | Holmes et al. | |
| 5,758,747 | A | | 6/1998 | Okazaki et al. | |
| 5,890,563 | A | | 4/1999 | Avitan et al. | |
| 6,193,015 | B1 | | 2/2001 | Kato | |
| 6,505,710 | B1 | | 1/2003 | Kato et al. | |
| 7,096,999 | B2 | | 8/2006 | Lewis et al. | |
| 7,121,384 | B2 | | 10/2006 | Polvilampi | |
| 7,134,527 | B2 | | 11/2006 | Grey et al. | |
| 7,175,000 | B2 | | 2/2007 | Gyllenhammar et al. | |
| 7,188,709 | B2 | | 3/2007 | Hofmann | |
| 7,195,105 | B2 | | 3/2007 | Tygard | |
| 7,255,202 | B2 | | 8/2007 | O'Keeffe | |
| 7,340,989 | B2 | | 3/2008 | Schönauer | |
| 7,395,901 | B2 | | 7/2008 | Hayashi | |
| 7,523,808 | B2 | | 4/2009 | Futamura | |
| 7,600,612 | B2 | | 10/2009 | Passeri | |
| 7,823,698 | B2 | | 11/2010 | Cano et al. | |
| 7,874,544 | B2 | | 1/2011 | Monroe | |
| 7,984,793 | B2 | | 7/2011 | Lewis et al. | |
| 8,424,649 | B2 | | 4/2013 | Mehloch et al. | |
| 8,646,578 | B2 | | 2/2014 | Hofman | |
| 8,714,311 | B2 | | 5/2014 | Billger et al. | |
| 8,777,545 | B2 | | 7/2014 | Roux | |
| 8,833,523 | B2 | | 9/2014 | Simpson | |
| 9,045,321 | B2 | | 6/2015 | Ford et al. | |
| 9,061,871 | B2 | | 6/2015 | Miwa et al. | |
| 9,376,297 | B2 | | 6/2016 | Hoock | |
| D764,740 | S | | 8/2016 | Brotherton et al. | |
| 9,440,827 | B2 | | 9/2016 | Recchia et al. | |
| 9,527,711 | B2 | | 12/2016 | Recchia et al. | |
| 9,550,660 | B2 | | 1/2017 | Jones | |
| 9,561,942 | B2 | | 2/2017 | Busuttil et al. | |
| 9,611,129 | B2 | | 4/2017 | Huber et al. | |
| 9,796,570 | B2 | | 10/2017 | Chan et al. | |
| 9,821,990 | B2 | | 11/2017 | Zanichelli | |
| 9,878,887 | B2 | | 1/2018 | Simpson | |
| 9,932,213 | B2 | | 4/2018 | Buchmann et al. | |
| 10,023,448 | B2 | | 7/2018 | Lewis et al. | |
| 10,207,906 | B2 | | 2/2019 | Meloch et al. | |
| 10,358,328 | B2 | | 7/2019 | Eizenhöfer et al. | |
| 10,435,280 | B2 | | 10/2019 | Goncalves | |
| 10,479,663 | B2 | | 11/2019 | Warner | |
| 10,544,023 | B2 | | 1/2020 | Nordenhem | |
| 10,549,971 | B2 | | 2/2020 | Nordenhem | |
| 10,562,746 | B2 | | 2/2020 | van Rooijen et al. | |
| 10,662,047 | B2 | | 5/2020 | Howe | |
| 10,773,937 | B2 | | 9/2020 | Berns et al. | |
| 10,821,886 | B1 | | 11/2020 | Breedvelt-Schouten et al. | |
| 11,167,969 | B2 | | 11/2021 | Boylu | |
| 2007/0221450 | A1 | | 9/2007 | Futamura | |
| 2010/0181148 | A1 | | 7/2010 | Simpson | |
| 2015/0075913 | A1 | | 3/2015 | Simpson | |
| 2016/0272475 | A1 | | 9/2016 | Sakatani | |
| 2017/0253471 | A1 | | 9/2017 | Brotherton et al. | |
| 2019/0084815 | A1 | | 3/2019 | Na | |
| 2019/0084816 | A1 | | 3/2019 | Stolten et al. | |
| 2019/0263646 | A1 | | 8/2019 | Kraimer et al. | |
| 2019/0322511 | A1 | | 10/2019 | Penicaud et al. | |
| 2019/0367341 | A1 | | 12/2019 | Stilwelle et al. | |
| 2020/0071074 | A1 | | 3/2020 | Hart et al. | |
| 2020/0206909 | A1 | | 7/2020 | Goncalves et al. | |
| 2020/0262690 | A1 | | 8/2020 | Okroy et al. | |
| 2020/0277173 | A1 | | 9/2020 | Howe et al. | |
| 2024/0239637 | A1 | | 7/2024 | Kato | |
| 2025/0313440 | A1 | | 10/2025 | Walthers | |

FOREIGN PATENT DOCUMENTS

| | | | | |
|---|---|---|---|---|
| CN | 216105881 | | | 3/2022 |
| CN | 218345108 | | | 1/2023 |
| DE | 10354093 | | | 10/2004 |
| EP | 126634 | | | 11/1984 |
| FR | 2006768 | | | 1/1970 |
| GB | 634822 | A | | 3/1950 |
| GB | 654866 | A | | 7/1951 |
| GB | 0405262 | | | 4/2004 |
| JP | S6222553 | Y2 | * | 6/1987 |
| JP | H07187594 | A | * | 7/1995 |
| JP | 2624026 | B2 | * | 6/1997 |
| JP | 2009057165 | A | * | 3/2009 |
| JP | 05217302 | | | 6/2013 |

OTHER PUBLICATIONS

International Search Report and Written Opinion for Application No. PCT/US2024/052253, mailed Dec. 30, 2024, 9 pages.
International Search Report and Written Opinion for Application No. PCT/US2024/052255, mailed Jan. 2, 2025, 9 pages.
International Search Report and Written Opinion for Application No. PCT/US2024/052258, mailed Jan. 8, 2025, 9 pages.
Lift-Tek Technologies, Inc., Sevice Manual, 30D/35D/40D/50D/55D/60D Full Free Lift 3-Stage Mast-MT, 2005, 46 pages.

* cited by examiner

FIG. 4A
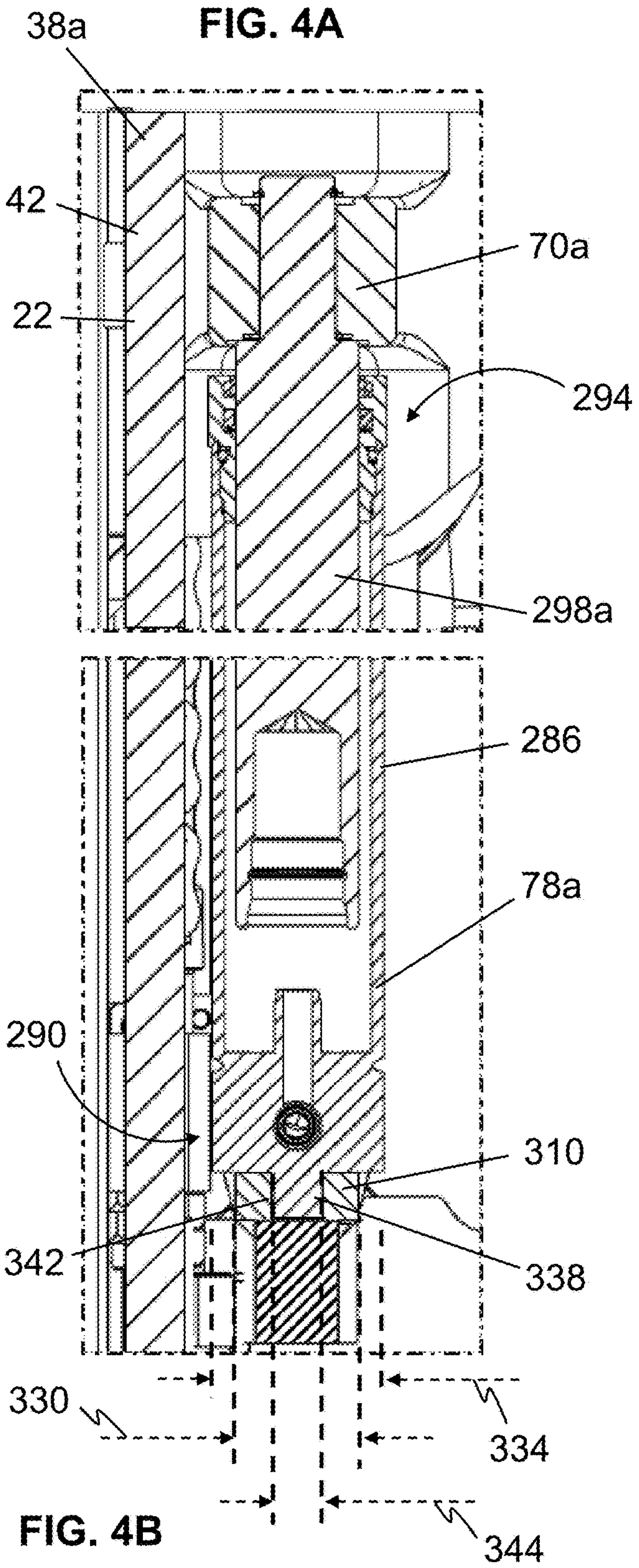
FIG. 4B
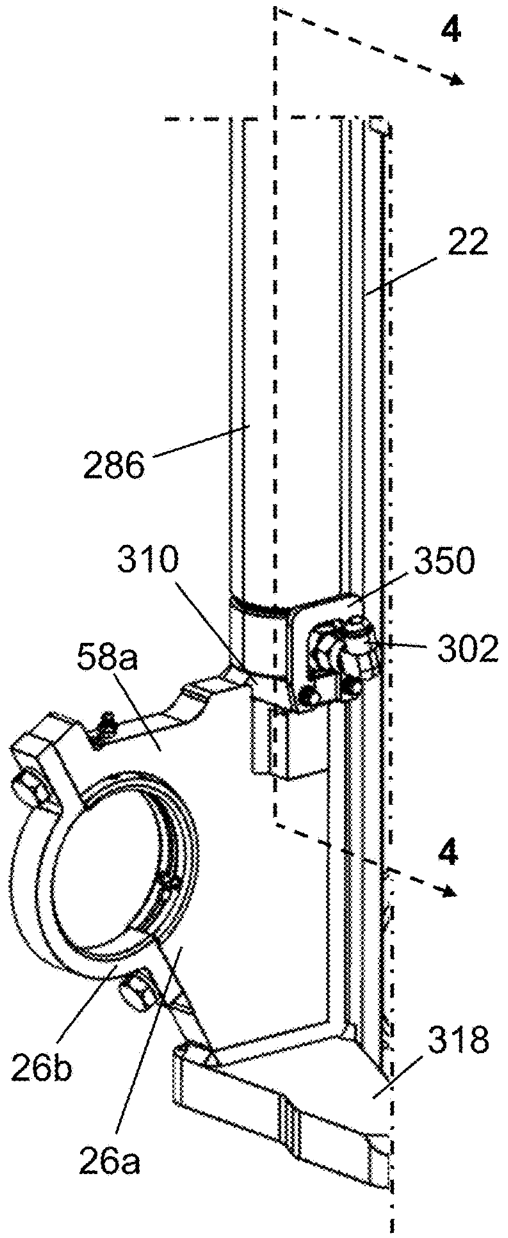
FIG. 5

FIG. 6A
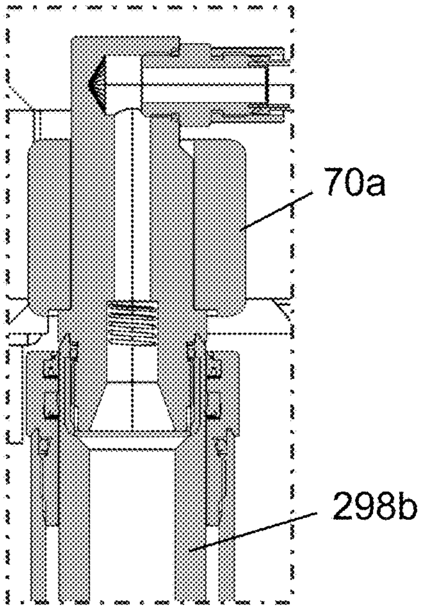
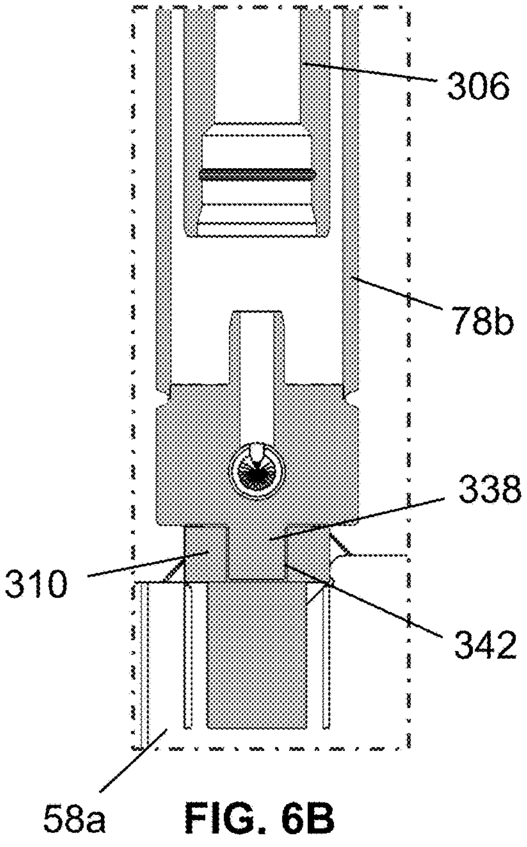
FIG. 6B
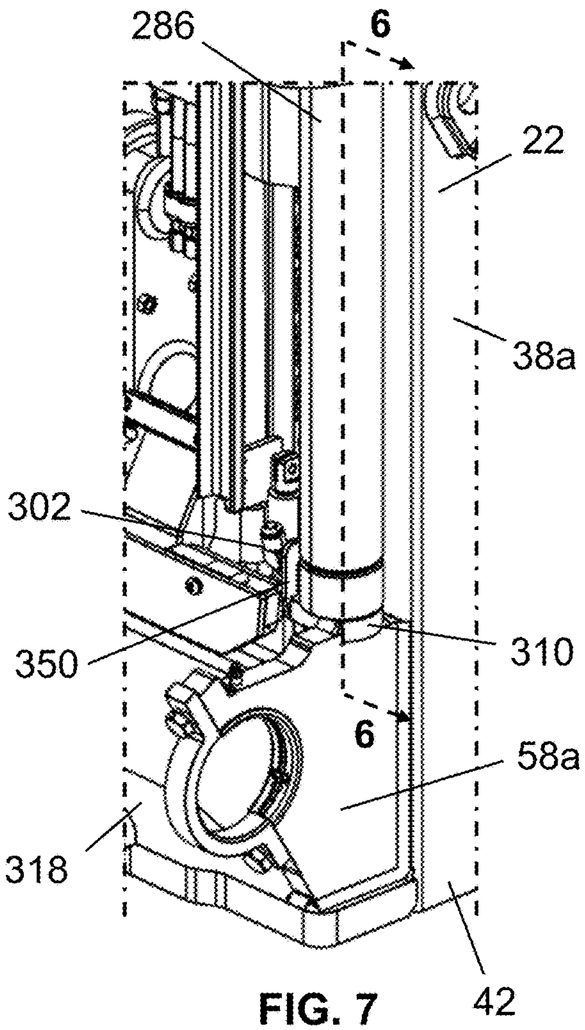
FIG. 7

FIG. 11E
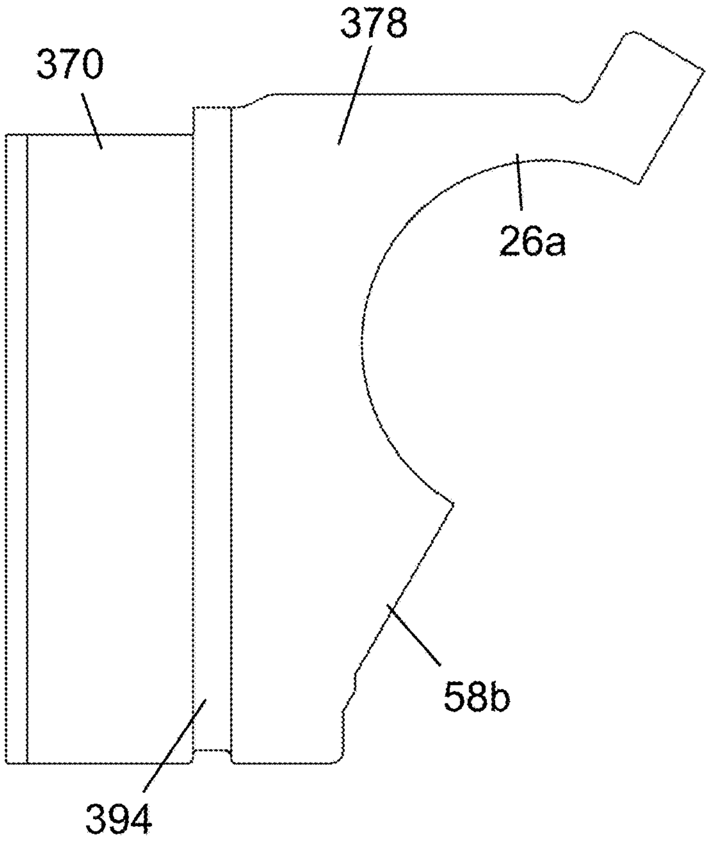
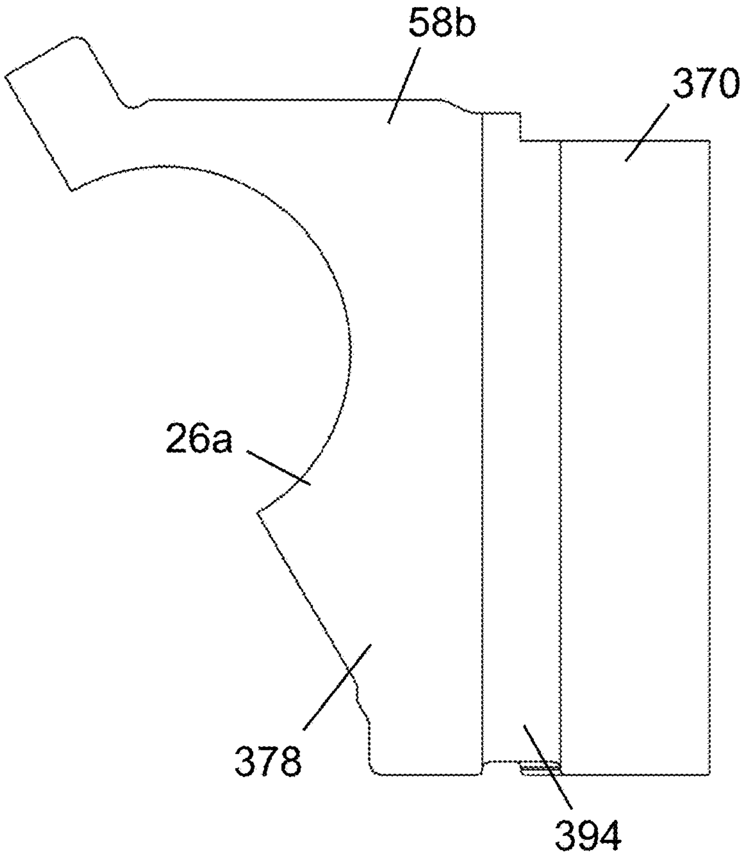
FIG. 11F

HOSE SUPPORTS FOR FACILITATING THE ASSEMBLY OF MASTS FOR MATERIAL HANDLING VEHICLES AND RELATED METHODS

CROSS-REFERENCE TO RELATED APPLICATIONS

This application claims priority to and the benefit of U.S. Provisional Patent Application No. 63/662,387, filed on Jun. 20, 2024 and entitled "High-Visibility Masts for Material Handling Vehicles"; U.S. Provisional Application No. 63/662,388, filed on Jun. 20, 2024 and entitled "Lift Cylinder Mounts for Reducing a Material Handling Vehicle's Front Overhang"; U.S. Provisional Patent Application No. 63/662,390, filed on Jun. 20, 2024 and entitled "Offset Mast Supports for Coupling a Mast to a Material Handling Vehicle and Related Methods"; and U.S. Provisional Application No. 63/662,392, filed on Jun. 20, 2024 and entitled "Hose Supports for Facilitating the Assembly of Masts For Material Handling Vehicles and Related Methods" the contents of which are incorporated in their entirety for all purposes.

FIELD OF INVENTION

The present invention relates generally to masts for material handling vehicles, and more specifically, but without limitation, masts for lift trucks.

BACKGROUND

Material handling vehicles, such as lift trucks, typically include masts for lifting loads. Such a mast can include forks, a clamp, and/or the like for interfacing with the load to be lifted. In some instances, these masts can include multiple stages, in which the mast has an outer mast and one or more inner masts that are translatable relative to the outer mast, as well as a carriage that is movable along the inner-most mast and can be liftable independently of the inner mast(s). Particularly for such multi-stage masts, visibility for an operator of the material handling vehicle—who is often positioned behind the mast opposite the load—can be limited. This due not just to the presence of the inner mast(s) between the outer mast, but also bracing of the outer mast for supporting those inner mast(s) and the load carried thereby, which can be moved well above the outer mast. Such reduced visibility poses safety issues in that, for example, the operator may not be able to adequately view the area in front of the material handling vehicle and/or the load lifted thereby.

Further, multi-stage stages typically include lift cylinders for lifting the inner mast(s) relative to the outer mast. Such lift cylinders carry the weight of the inner mast(s) and the load lifted by the inner mast(s) and therefore must be adequately supported. Existing lift cylinder mounts may provide such support, but they often do so at a cost. In particular, existing lift cylinder mounts may surround the lift cylinders they support and/or the existing lift cylinder mounts (and/or the structures via which they are coupled to the outer mast) may be obtrusive, such that spacing of the lift cylinders from the outer mast and/or spacing of the mast from the material handling vehicle is required to accommodate them. This can present several issues, such as increasing the material handling vehicle's front overhang, which can, for example, reduce the material handling vehicle's turning radius and increase bending loads borne by the material handling vehicle when the mast lifts a load.

In some instances, the outer mast is wider than the portion of the material handling vehicle to which the mast is to be mounted, meaning mast mounts for coupling the outer mast to the material handling vehicle must be offset from outer rails of the outer mast. This is traditionally accomplished through multi-piece mast mounts, such as multiple plates welded together along which the material-handling-vehicle-mounting portion of the mast mount is consecutively moved inboard of the outer rail. But this approach, in addition to adding cost and complexity, can result in stress concentrations where the pieces are joined together and raise packaging concerns similar to those described above.

Masts typically come in various heights. These masts, despite their varying heights, can have similar items—such as hoses—that must be secured relative to the masts. Typically, components for securing such items relative to the masts also come in various heights that each correspond to the height of the mast to which the component is intended to be coupled. This can introduce cost and complexity in that distinct components are often required to secure otherwise similar items (e.g., hoses) to masts of varying heights.

SUMMARY

The present masts can each address one or more of these issues. To illustrate, for ones of the multi-stage masts, the outer rails can include a horizontal brace joining the outer rails at their upper ends as well as auxiliary braces, each coupled to a respective one of the outer rails and joined to the horizontal brace via one or more vertical braces, where a minimum horizontal distance between the auxiliary braces is at least 90% of a minimum horizontal distance between inner rails of at least one of the inner mast(s). In at least this way, the outer mast can be bolstered by the non-view-obstructing auxiliary braces and the vertical supports extending between the auxiliary braces and the horizontal brace, allowing, for example, the horizontal brace to be relatively thinner and thereby enhancing an operator's visibility through the mast.

Further, in some masts, the vertical braces can be coupled to upper surfaces of the auxiliary braces to provide enhanced support to the auxiliary braces. This can be particularly beneficial when the auxiliary braces are coupled to chains for lifting—and thus bear the weight of—one or more of the inner mast(s).

Further, some of the present masts can include lift cylinder mounts and/or structures for coupling the lift cylinder mounts to the outer rails, such as mast supports, that allow the lift cylinders to be positioned more closely to the outer rails, which can, for example, reduce the front overhang of a material handling vehicle coupled to the mast. To illustrate, in some masts, each of the lift cylinder mounts can define an opening into which a protrusion extending from a lower end of a cylinder body of its supported lift cylinder is received. In this way, for example, the cylinder body may be disposed closer to the outer rail than is the lift cylinder mount. To further illustrate, in some masts, each of the lift cylinder mounts is coupled to an upper surface of one of the mast supports such that no portion of the mast support that couples the lift cylinder mount to the outer rail extends above the protrusion of the supported lift cylinder.

Particularly for masts in which the outer mast is wider than a distance between acceptable mast-mounting points along the material handling vehicle (e.g., along the vehicle's axle), some of the present masts include mast mounts, each having a first portion that is coupled to one of the outer rails and extends in a first horizontal direction that is toward the other of the mast mounts, and a second portion coupled to the first portion that extends in a second horizontal direction that is angularly disposed relative to the first horizontal direction, where the second portion defines at least a part of a mount between the mast and the material handling vehicle (e.g., at least part of an axle mount). For each of the mast mounts, the first and second portions can be unitary, and more specifically, can be joined by a bent portion of the mast mount. Such a configuration can alleviate issues posed by multiple-piece offset mast-mounts (e.g., cost, complexity, and stress concentrations, such as where the pieces are joined to one another) and, at least by eliminating the need for additional pieces, allow for the mounting of the lift cylinders close to the outer rails as described above.

Further, some masts can have heights that vary from one another. To secure hoses to such masts, two or more of the masts of varying heights can each include a hose support having an upper linear portion coupled to the mast and a lower linear portion coupled to the mast, where the upper and lower linear portions of the hose supports are angularly disposed relative to one another by an angle that is substantially the same. At least by keeping this angle substantially the same between hose supports for masts of different heights, each of the hose supports can be joined to its mast at its upper linear portion by substantially the same bracket and joined to its mast at its lower linear portion via a slot coupled to its lower linear portion and/or cutting the lower linear portion to length. In either event, the number of components needed to support hoses relative to masts of various heights is reduced.

Some of the present masts for material handling vehicles comprise two outer rails, each extending in a vertical direction between lower and upper ends, one or more—optionally two or more—pairs of inner rails, wherein each of the pair(s) of inner rails is disposed between the outer rails and configured to translate in the vertical direction relative to the outer rails, a horizontal brace coupled to and extending between the outer rails, the horizontal brace disposed closer to the upper end of each of the outer rails than to the lower end of each of the outer rails, two auxiliary braces, wherein each of the auxiliary braces is coupled to a respective one of the outer rails and is disposed below the horizontal brace, and a minimum distance, measured in a horizontal direction that is substantially perpendicular to the vertical direction, between the auxiliary braces is at least 90% of a minimum distance, measured in the horizontal direction, between the inner rails of at least one of the pair(s) of inner rails, and for each of the auxiliary braces, one or more vertical braces, each coupled to and extending between an upper surface of the auxiliary brace and the horizontal brace. In some masts, a thickness of the horizontal brace is less than or equal to 7.0 centimeters (cm).

In some masts, the horizontal brace includes an offset segment extending in the horizontal direction, and a minimum distance, measured in a depthwise direction that is substantially perpendicular to each of the vertical and horizontal directions, between the offset segment of the horizontal brace and each of the outer rails is at least 20% of a minimum distance, measured in the horizontal direction, between the outer rails. In some masts, the horizontal brace includes two outer segments, each extending between the offset segment and a respective one of the outer rails such that the outer segment is coupled to an outer surface of the outer rail that faces away from the other of the outer rails, and the offset segment extends between the outer segments.

In some masts, each of the auxiliary braces has an edge that connects the upper surface of the auxiliary brace to a lower surface of the auxiliary brace and a width, measured in the horizontal direction, of the horizontal brace and a maximum distance, measured in the horizontal direction, between the edge of a first one of the auxiliary braces and the edge of a second one of the auxiliary braces are each between 20% and 40% larger than a distance, measured in the horizontal direction, between the outer surface of a first one of the outer rails and the outer surface of a second one of the outer rails. In some masts, the width of the horizontal brace and the maximum distance, measured in the horizontal direction, between the edge of the first auxiliary brace and the edge of the second auxiliary brace are each between 70.0 and 90.0 cm.

Some masts comprise a carriage configured to translate vertically relative to the outer rails and each of the pair(s) of inner rails, wherein a width of the carriage, measured in the horizontal direction, is within 13% of each of the width of the horizontal brace and the maximum distance, measured in the horizontal direction, between the edge of the first auxiliary brace and the edge of the second auxiliary brace.

In some masts, each of the auxiliary braces has an edge that connects the upper surface of the auxiliary brace to a lower surface of the auxiliary brace, wherein, taken in the depthwise direction, a portion of the edge that is disposed furthest from the outer rail to which the auxiliary brace is coupled is disposed closer to the outer rail to which the auxiliary brace is coupled than is the offset segment of the horizontal brace.

In some masts, for each of the auxiliary braces, the one or more vertical braces include a first vertical brace that has opposing inner and outer surfaces and inner and outer edges, each of the inner and outer edges connecting the inner surface to the outer surface and having first and second segments, wherein the first segment extends between the horizontal brace and the second segment, a first line that extends from an upper end of the first segment to a lower end of the first segment is substantially parallel to the vertical direction, a second line that extends from an upper end of the second segment to a lower end of the second segment is angularly disposed relative to the first line by an angle that is between 20 and 70 degrees and is within 30 degrees of parallel to the second line that extends from the upper end of the second segment of the other of the edges to the lower end of the second segment of the other of the edges, and a lower end of the second segment is disposed closer to each of the auxiliary braces than is an upper end of the second segment, wherein the inner edge is disposed closer to the other of the auxiliary braces than is the outer edge.

In some masts, for each of the auxiliary braces, a line that is normal to the outer surface of the first vertical brace is angularly disposed relative to each of the horizontal and depthwise directions by an angle that is at least 20 degrees. In some masts, for each of the auxiliary braces, a length of the first segment of the outer edge of the first vertical brace is at least 10% longer than a length of the first segment of the inner edge of the first vertical brace, and a length of the second segment of the inner edge of the first vertical brace is at least 10% longer than a length of the second segment of the outer edge of the first vertical brace.

In some masts, for each of the auxiliary braces, the first vertical brace extends from a lower surface of the horizontal brace to the upper surface of the auxiliary brace, wherein a line that is normal to the upper surface of the auxiliary brace is substantially parallel to the vertical direction. In some masts, for each of the auxiliary braces, a distance, measured in the vertical direction, between the lower surface of the horizontal brace and the upper surface of the auxiliary brace is between 5% and 15% of a height, measured in the vertical direction, of each of the outer rails.

In some masts, for each of the auxiliary braces, the one or more vertical braces include a second vertical brace. In some masts, for each of the auxiliary braces, the second vertical brace is disposed closer to the outer rail to which the auxiliary brace is coupled than is the first vertical brace. In some masts, for each of the auxiliary braces, the second vertical brace has opposing inner and outer surfaces, wherein a line that is normal to the outer surface is substantially parallel to the horizontal direction. In some masts, for each of the auxiliary braces, the second vertical brace has inner and outer edges, each connecting the inner surface of the second vertical brace to the outer surface of the second vertical brace, and, each of the inner and outer edges of the second vertical brace extends in a direction that is substantially parallel to the vertical direction. In some masts, for each of the auxiliary braces, the second vertical brace extends from a lower surface of the horizontal brace to the upper surface of the auxiliary brace, wherein a line that is normal to the upper surface of the auxiliary brace is substantially parallel to the vertical direction.

In some masts, the one or more pairs of inner rails comprise first and second pairs of inner rails, the second pair of inner rails disposed between the first pair of inner rails and movable to a position at which an upper end of each of the inner rails of the pair is disposed higher than an upper end of each of the inner rails of the first pair. In some masts, the pairs of inner rails further comprise a third pair of inner rails, wherein the third pair of inner rails is disposed between the second pair of inner rails and is movable to a position at which the upper end of each of the inner rails of the third pair is disposed higher than the upper end of each of the inner rails of the first pair and the upper end of each of the inner rails of the second pair.

Some masts comprise one or more hydraulic lift cylinders configured to lift the first pair of inner rails vertically relative to the outer rails. Some masts comprise, for the second pair of inner rails, two chains that each are disposed at least partially around one or more pulleys coupled to the first pair of inner rails and have a first end coupled to one of the auxiliary braces and a second end coupled to the second pair of inner rails such that when the first pair of inner rails is lifted vertically, the second pair of inner rails is lifted vertically relative to the first pair of inner rails. Some masts comprise, for the third pair of inner rails, one or more chains that are each disposed at least partially around one or more pulleys coupled to the second pair of inner rails and have a first end coupled to the first pair of inner rails and a second end coupled to the third pair of inner rails such that when the hydraulic lift cylinder(s) lift the first pair of inner rails vertically, the third pair of inner rails is lifted vertically relative to the second pair of inner rails.

Some of the present masts for material handling vehicles comprise an outer mast extending between a lower end and an upper end, the outer mast including outer mast rails that each extend between the lower end and the upper end of the outer mast, an inner mast disposed within and translatable relative to the outer mast, mast supports configured to couple the mast to a material handling vehicle, each of the mast supports coupled to a respective one of the outer mast rails at the lower end of the outer mast and defining a portion of an axle mount, lift cylinders coupled to the outer mast and the inner mast such that actuation of the lift cylinders translates the inner mast relative to the outer mast, each of the lift cylinders including a cylinder body extending between a lower end and an upper end, a protrusion extending from the lower end of the cylinder body, the protrusion having a maximum transverse dimension that is less than a maximum transverse dimension of the cylinder body, and a rod that is extendable from the upper end of the cylinder body in response to actuation of the lift cylinder, wherein the rod is coupled to the inner mast, and lift cylinder mounts, each coupled to an upper surface of a respective one of the mast supports and defining an opening into which the protrusion of a respective one of the lift cylinders is received.

In some masts, for each of the lift cylinder mounts, the cylinder body of the respective lift cylinder is disposed closer to the respective outer mast rail to which the respective mast support is coupled than is the lift cylinder mount. In some masts, for each of the lift cylinder mounts, no portion of the lift cylinder mount is disposed between the cylinder body of the respective lift cylinder and the respective outer mast rail to which the respective mast support is coupled. In some masts, for each of the lift cylinder mounts, no portion of the lift cylinder mount extends above the protrusion of the respective lift cylinder. In some masts, each of the lift cylinder mounts has a width that is 0.9 or less times a maximum transverse dimension of the cylinder body of the respective lift cylinder.

In some masts, each of the lift cylinder mounts comprises a substantially constant thickness. In some masts, each of the lift cylinder mounts comprises a plate that defines the opening. In some masts, each of the lift cylinder mounts is coupled to the upper surface of a respective mast support such that the lift cylinder mount extends completely across the upper surface between opposing sides of the mast support.

In some masts, for each of the lift cylinders, a maximum transverse dimension of the protrusion is 0.5 or less times a maximum transverse dimension of the cylinder body. In some masts, each of the lift cylinders includes a fitting coupled to the lower end of the cylinder body through which fluid is permitted to flow into and out of the cylinder body.

In some masts, for each of the mast supports, no portion of the mast support extends above the protrusion of the respective lift cylinder to which the mast support is coupled via the respective lift cylinder mount. In some masts, for each of the mast supports, the portion of the mast support coupled to the respective outer mast rail has a substantially constant thickness. In some masts, each of the mast supports has a substantially constant thickness. In some masts, each of the mast supports comprises a plate that defines the upper surface to which the respective lift cylinder mount is coupled and the portion of the axle mount. Some masts comprise a brace extending between the outer mast rails of the outer mast at the lower end of the outer mast, wherein each of the mast supports is coupled to the brace.

In some masts, the outer mast rails extend in a first direction between the lower end and the upper end of the outer mast, and each of the mast supports comprises a first portion coupled to the respective outer mast rail and extending from the outer mast rail in a second direction that is perpendicular to the first direction and a second portion coupled to the first portion and extending from the first portion in a third direction that is perpendicular to the first direction and angularly disposed relative to the second direction, the second portion defining the portion of the axle mount. In some masts, an angle between the second direction and the third direction is between 145 and 165 degrees.

In some masts, for each of the mast supports, the first and second portions are unitary. In some masts, for each of the mast supports, a maximum thickness of the first portion is substantially the same as a maximum thickness of the second portion. In some masts, each of the mast supports comprises a plate that defines the first and second portions, and the plate is bent between the first and second portions. In some masts, for each of the mast supports, the first portion defines the upper surface to which the respective lift cylinder mount is coupled.

Some masts comprise a second inner mast disposed within and translatable relative to the inner mast. Some masts comprise a third inner mast disposed within and translatable relative to the second inner mast.

Some of the present masts comprise two opposing mast rails, each extending in a first direction, a carriage configured to translate relative to the mast rails in the first direction, and mast supports configured to couple the mast to a material handling vehicle, each of the mast supports comprising a body that is coupled to a respective one of the mast rails, the body including a first portion coupled to the mast rail and extending from the mast rail in a second direction that is perpendicular to the first direction and toward the other one of the mast rails and a second portion coupled to the first portion, the second portion extending in a third direction that is perpendicular to the first direction and is angularly disposed relative to the second direction and including a portion of an axle mount. In some masts, for each of the mast supports, an angle between the second direction and the third direction is between 145 and 165 degrees.

In some masts, for each of the mast supports, the body is unitary. In some masts, for each of the mast supports, the body comprises a plate that defines the first portion, the second portion, and a bent portion disposed between the first and second portions. In some masts, for each of the mast supports, a radius of the bent portion is between 2 and 4 cm. In some masts, for each of the mast supports, a bend axis of the bent portion is parallel to the first direction.

In some masts, for each of the mast supports, each of the first and second portions has a thickness that is between 2.5 and 4.5 cm. In some masts, for each of the mast supports, a maximum thickness of the first portion is substantially the same as a maximum thickness of the second portion.

In some masts, the third directions of the mast supports are parallel to one another. In some masts, a horizontal distance between outermost surfaces of the second portions of the mast supports is 0.95 or less times a horizontal distance between outermost surfaces of the mast rails.

Some masts comprise lift cylinder mounts, each coupled to a respective one of the mast supports along a top surface of the first portion of the mast support. In some masts, for each of the mast supports, the first portion is welded to the respective outer mast rail. Some masts comprise a brace extending between the mast rails, wherein each of the mast supports is welded to the brace.

Some of the present methods of assembling masts for material handling vehicles comprise forming a mast support at least by bending a plate such that a bent portion of the plate separates a first portion of the plate that extends in a second direction and a second portion of the plate that extends in a third direction that is angularly disposed relative to the second direction and includes a portion of an axle mount, and coupling the first portion of the plate to a mast rail, the mast rail extending in a first direction that is perpendicular to the second and third directions. In some methods, an angle between the second direction and the third direction is between 145 and 165 degrees. In some methods, a bend radius of the bent portion is between 2 and 4 cm. In some methods, the plate has a thickness that is between 2.5 and 4.5 cm.

In some methods, coupling the first portion of the plate to the mast rail comprises welding the first portion to the mast rail. Some methods comprise welding a lift cylinder mount to an upper surface of the first portion of the plate. Some methods comprise coupling the portion of the axle mount to an axle of a material handling vehicle.

Some of the present hose supports for masts of material handling vehicles comprise a lower linear portion having a length and an upper linear portion having a length that is larger than the length of the lower linear portion, the upper linear portion being angularly disposed relative to the lower linear portion by an angle of at least 5 degrees, a lower bracket configured to couple the lower linear portion to a mast of a material handling vehicle, and an upper bracket configured to couple the upper linear portion to the mast, wherein the lower bracket and/or the upper bracket each define a slot extending in a first direction that is parallel to the length of the lower linear portion and/or opening(s) spaced apart from one another in the first direction, each of the slot(s) and/or openings configured to receive a fastener for coupling the hose support to the mast. In some hose supports, the lower bracket defines at least one of the slot(s). In some hose supports, the upper bracket defines at least some of the openings.

In some hose supports, the angle is between 5 and 20 degrees. Some hose supports comprise a bent portion joining the lower linear portion to the upper linear portion. In some hose supports, the bent portion is not welded to either the upper linear portion or the lower linear portion. In some hose supports, each of the lower linear portion and the upper linear portion defines a channel configured to receive one or more hoses. In some hose supports, the upper bracket is welded to the upper portion, and the lower bracket is welded to the lower portion.

Some of the present methods for assembling masts of material handling vehicles comprise coupling a first hose support to an upper portion of a first mast and a lower portion of the first mast that is positioned below the upper portion of the first mast, the coupling such that the first hose support includes an upper linear portion coupled to the upper portion of the first mast and a lower linear portion coupled to the lower portion of the first mast, the upper linear portion and the lower linear portion of the first hose support being angularly disposed relative to one another by a first angle, and coupling a second hose support to an upper portion of a second mast and a lower portion of the second mast that is positioned below the upper portion of the second mast, the coupling such that the second hose support includes an upper linear portion coupled to the upper portion of the second mast and a lower linear portion coupled to the lower portion of the second mast, the upper linear portion and the lower linear portion of the second hose support being angularly disposed relative to one another by a second angle that is the same as the first angle, wherein a length of the lower linear portion of the first hose support is at least 10% larger than a length of the lower linear portion of the second hose support. In some methods, the upper linear portions of the first and second hose supports comprise the same length. In some methods, each of the first and second angles is between 5 and 20 degrees.

Some methods comprise cutting the lower linear portion of the second hose support to its length after the lower linear portion of the second hose support is angularly disposed relative to the upper linear portion of the second hose support.

In some methods, coupling the first hose support to the first mast and coupling the second hose support to the second mast each comprise disposing a fastener through a slot defined by a first bracket of the hose support. In some methods, the first bracket of the first hose support and the first bracket of the second hose support are the same. In some methods, coupling the first hose support to the first mast and coupling the second hose support to the second mast each comprise disposing a fastener through one or more openings defined by a second bracket of the hose support, ones of the openings being spaced from one another in a direction that is parallel to the length of the lower linear portion. In some methods, the second bracket of the first hose support and the second bracket of the second hose support are the same.

In some methods, each of the first and second hose supports comprises a bent portion joining the upper linear portion to the lower linear portion. In some methods, for each of the first and second hose supports, the bent portion is not welded to either the upper linear portion or the lower linear portion. In some methods, for each of the first and second hose supports, the upper and lower linear portions each define a channel configured to receive one or more hoses.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The terms "substantially," "about," and "approximately" are each defined as largely but not necessarily wholly what is specified—and include what is specified, e.g., substantially 90 degrees includes 90 degrees and substantially parallel includes parallel—as understood by a person of ordinary skill in the art. As used herein, "substantially parallel" means within 10 degrees of parallel to, and "substantially perpendicular" means within 10 degrees of perpendicular to. In any disclosed embodiment, the terms "approximately" and "about" may each be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus or system that "comprises," "has," or "includes" one or more elements possesses those one or more elements but is not limited to possessing only those elements. Likewise, a method that "comprises," "has," or "includes" one or more steps possesses those one or more steps but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above in order to change the scope of a given claim from what it would otherwise be using the open-ended linking verb.

Further, an apparatus or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale unless otherwise noted, meaning, for each of the figures, the sizes of the depicted elements are accurate relative to each other for at least the embodiment shown in the figure.

FIGS. 4A and 4B are cross-sectional side views of one of the lift cylinders of FIG. 2A's mast, taken along line 4-4 of FIG. 5.

FIG. 5 is a partial perspective view of the mast of FIG. 2A.

FIGS. 6A and 6B are cross-sectional side views of one of the lift cylinders of FIG. 2A's mast, taken along line 6-6 of FIG. 7.

FIG. 7 is a partial perspective view of the mast of FIG. 2A.

FIGS. 11A-11F are top, bottom, rear, front, left side, and right side views, respectively, of one of the mast mounts of FIG. 10A.

DETAILED DESCRIPTION

Figure 1:
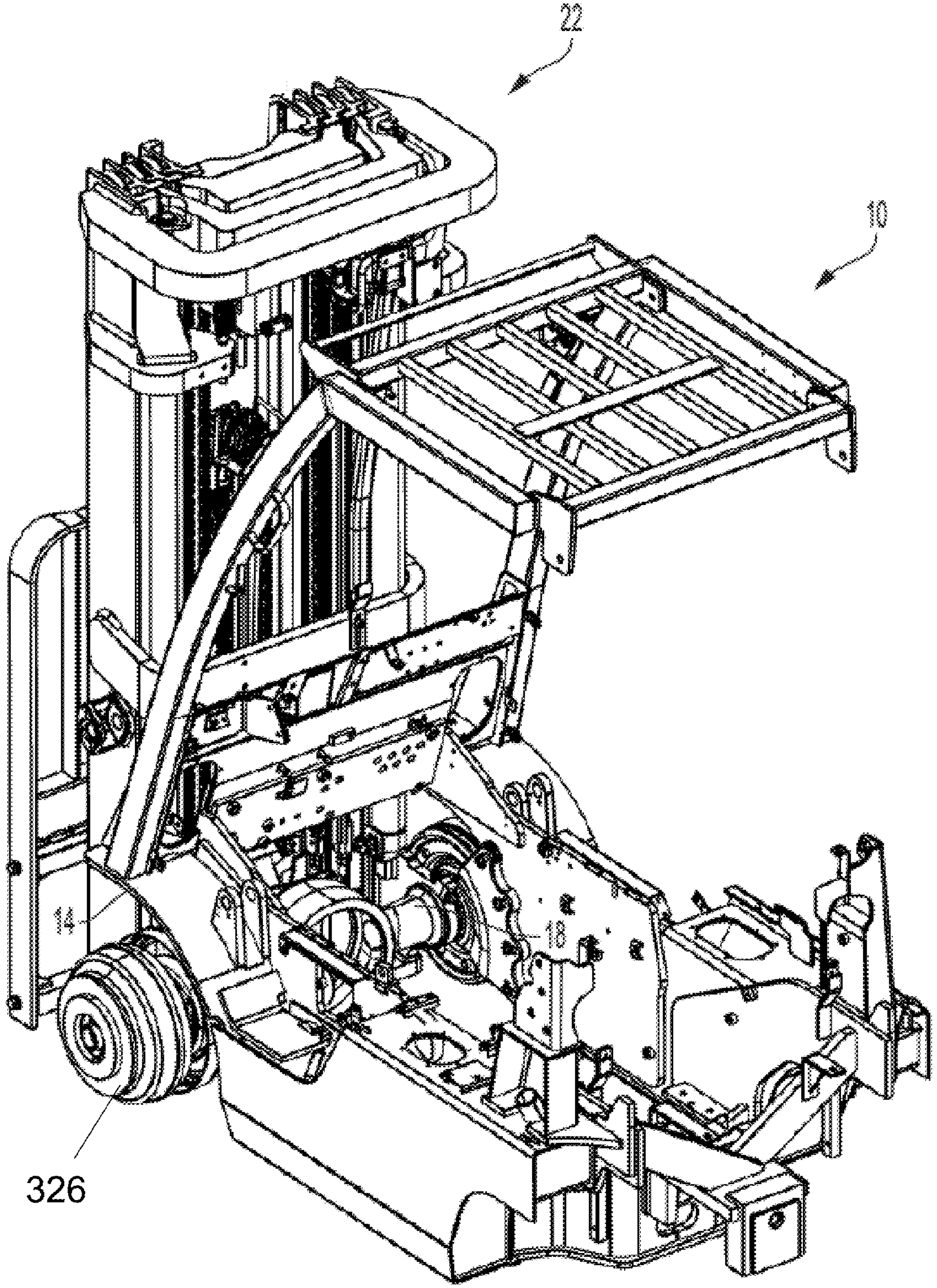
FIG. 1 is a perspective view of the mast of FIG. 2A coupled to a material handling vehicle.

Referring to FIG. 1, shown are portions of a material handling vehicle 10, and more specifically, portions of a frame 14 and an axle 18 of the material handling vehicle. Material handling vehicle 10 is coupled to a mast 22. To illustrate, mast 22 can be coupled to axle 18 of material handling vehicle 10 via axle mounts 26 that each at least partially surround the axle. As shown, material handling vehicle 10 is a lift truck; however, the present masts (e.g., 22) can be usable with any suitable material handling vehicle, including a forklift, reach truck, and/or the like. Mast 22, as described in more detail below, can allow material handling vehicle 10 to lift a load. To interface with that load, mast 22 can include forks, one or more clamps, and/or the like. Some masts (e.g., 22)—beyond lifting the load—can tilt the load (e.g., about axle 18), shift the load (e.g., in a direction parallel to the axle), and/or the like.

Turning to FIGS. 2A-2G, mast 22 comprises an outer mast 38*a* having two outer rails 42, each extending between a lower end 46 and an upper end 50 of the outer mast in a vertical direction 54. To couple mast 22 to material handling vehicle 10, the mast can include mast supports 58*a*, each coupled (e.g., welded) to one of outer rails 42 at lower end 46 of outer mast 38*a*. Mast supports 58*a* can each define a portion—up to and including all of—one of axle mounts 26. In the depicted embodiment, axle mounts 26 each include two axle mount portions, 26*a* and 26*b*, where those axle mount portions define recesses that, when the axle mount portions are coupled together (e.g., via fasteners), cooperate to surround axle 18. In this configuration, axle mount portions 26*a* can be defined by mast supports 58*a*, and axle mount portions 26*b* can be separate pieces. Axle mounts 26 are provided solely by way of illustration, as the present masts can be mounted to a material handling vehicle (e.g., 10) in any suitable fashion, including via other axle mounts and/or mounts configured to be attached to other portions of the material handling vehicle, such as its frame (e.g., 14).

As shown, mast 22 can include a carriage 62 (FIG. 2B) that is configured to translate in vertical direction 54 relative to outer rails 42. In particular, mast 22 can include a free lift cylinder 66 coupled to its innermost mast (e.g., 70*c*, described below) and configured to lift carriage 62 relative to the innermost mast. Such functionality can be accomplished by, for example, one or more chains, each disposed around a pulley coupled to free lift cylinder 66, with a first end of the chain coupled to carriage 62 and a second end of the chain coupled to the innermost mast—as the free lift cylinder lifts the pulley relative to the innermost mast, the chain lifts the carriage relative to the innermost mast. Free lift cylinder 66 is, however, not necessary; for example, in some masts, the carriage can be coupled to the innermost mast such that lifting of the carriage requires lifting of the innermost mast. Carriage 62 can be configured to be coupled to attachments for interfacing with a load lifted by mast 22, such as forks, one or more clamps, and/or the like.

Figure 2A:
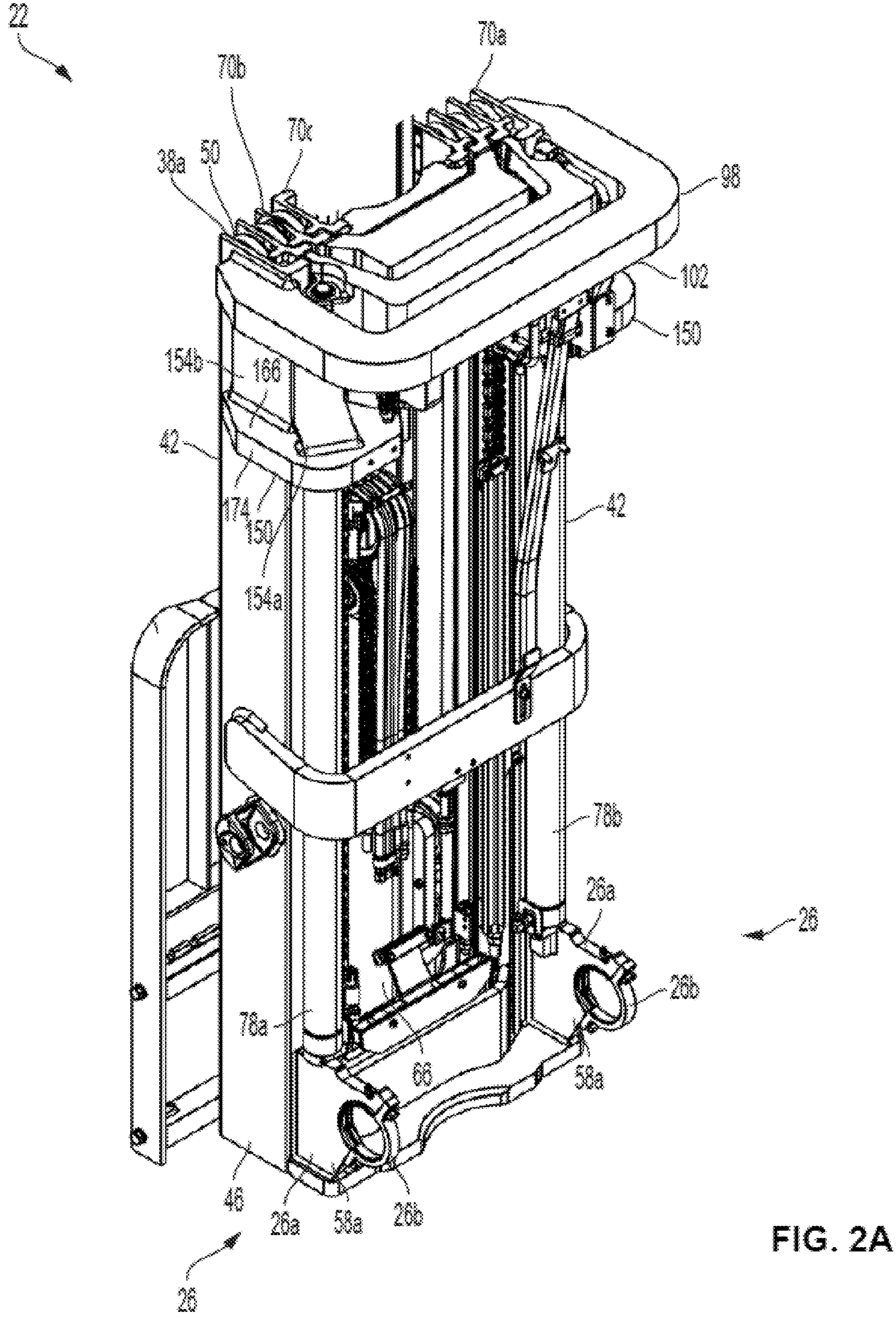
FIG. 2A is a perspective view of a mast, the mast including an outer mast having outer rails configured to be coupled to a material handling vehicle via mast mounts and inner masts configured to be lifted relative to the outer mast via lift cylinders coupled between the outer mast and the inner masts.
Figure 2B:
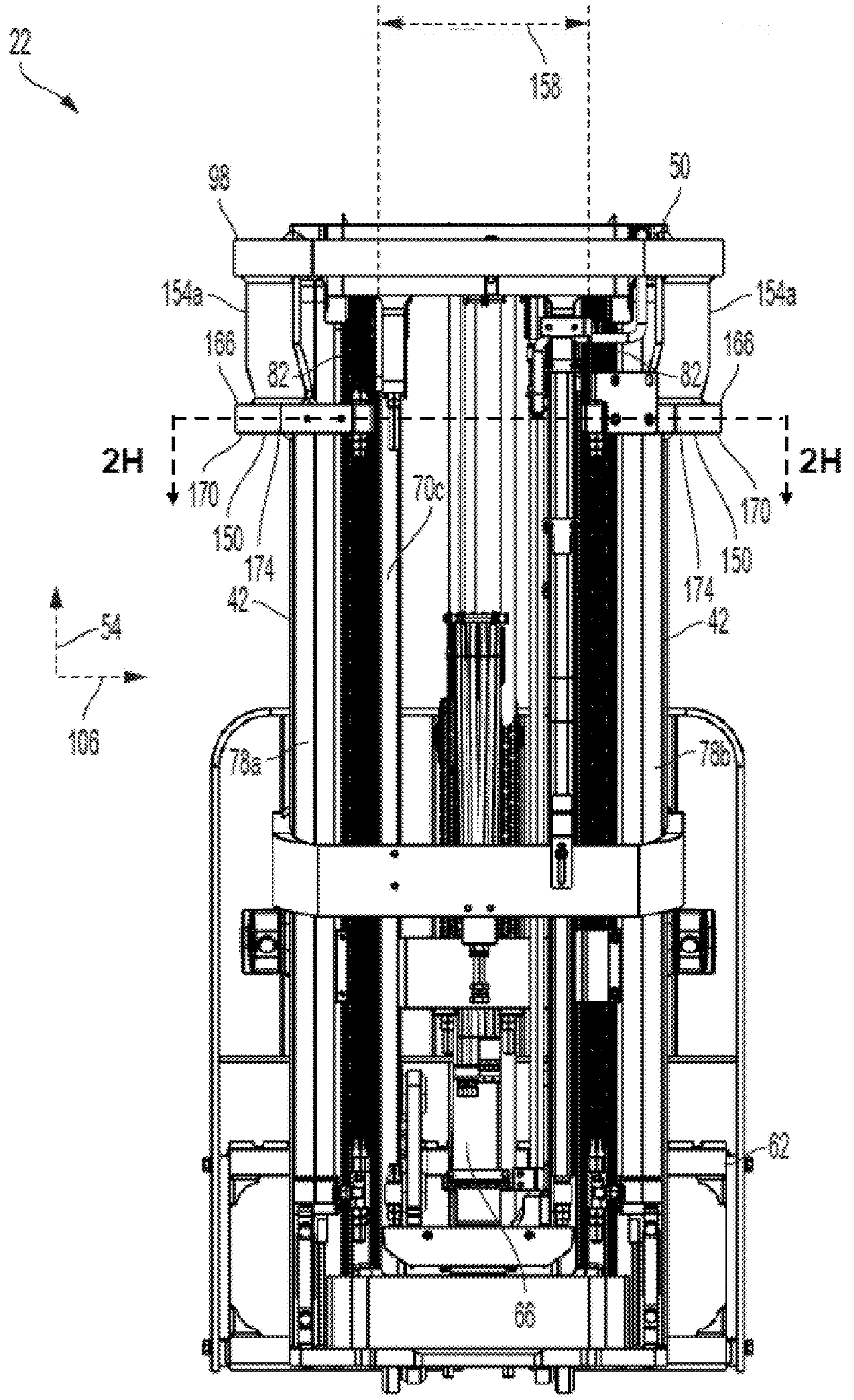
FIGS. 2B-2G are rear, front, left side, right side, top, and bottom views, respectively of the mast of FIG. 2A.
Figure 2C:
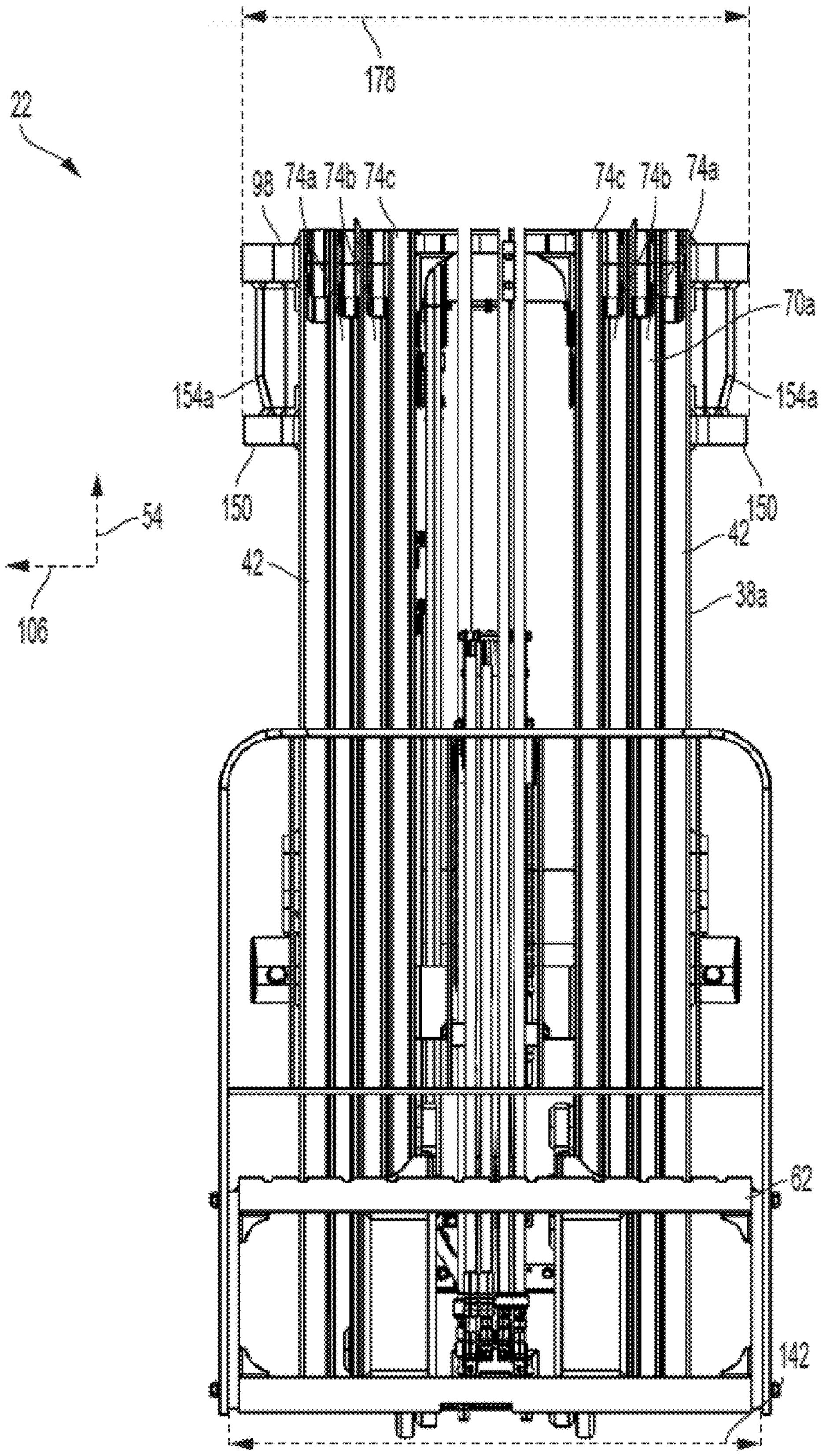
Figure 2D:
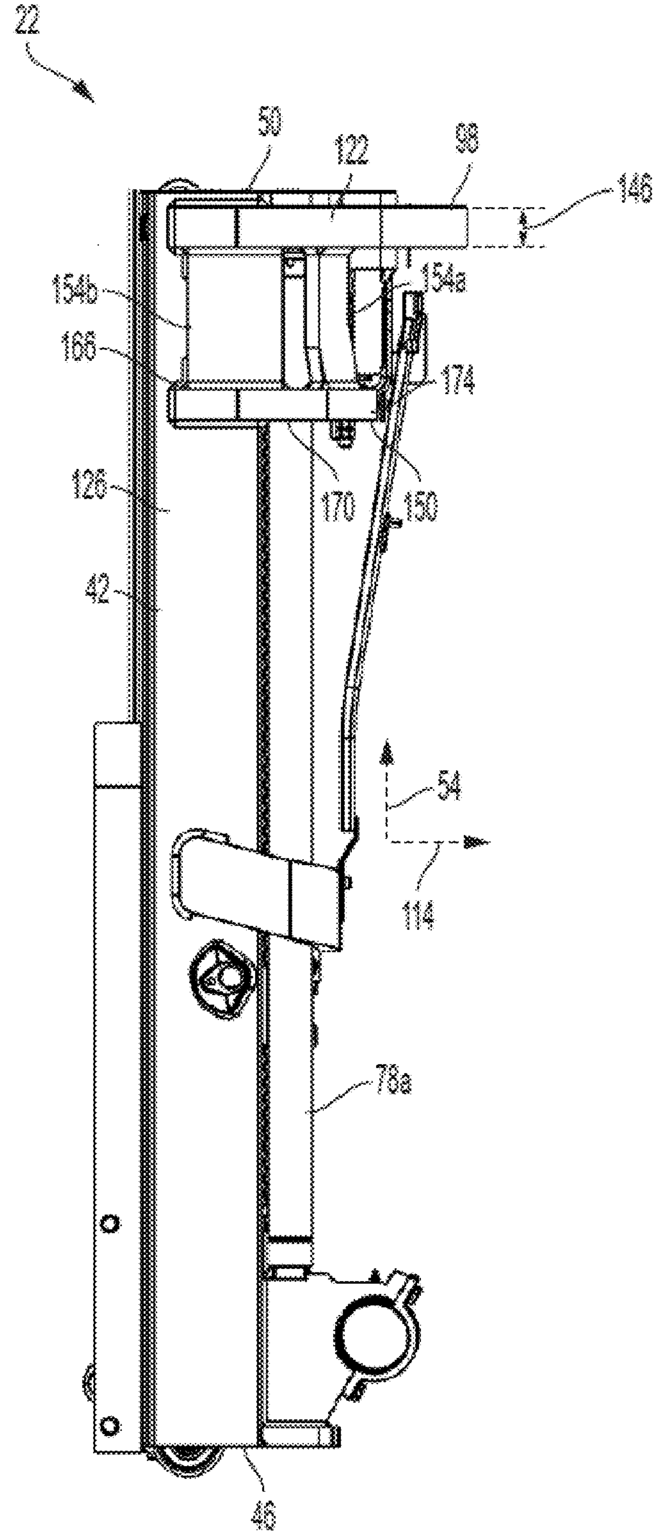
Figure 2E:
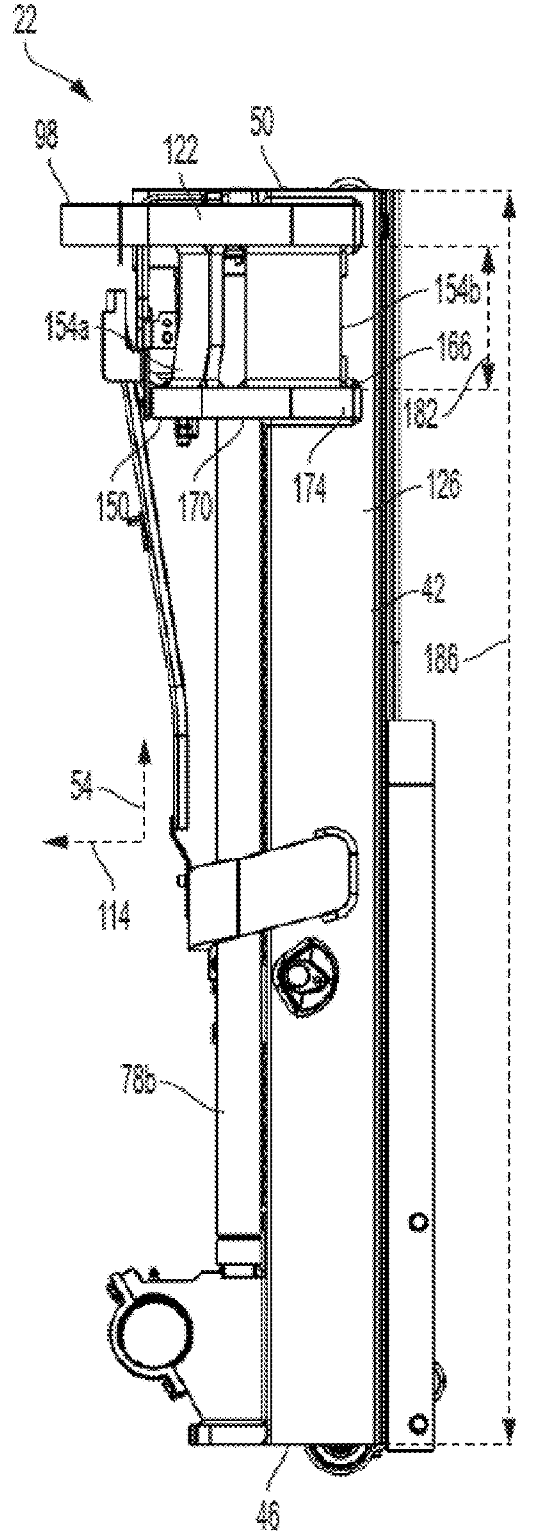
Figure 2F:
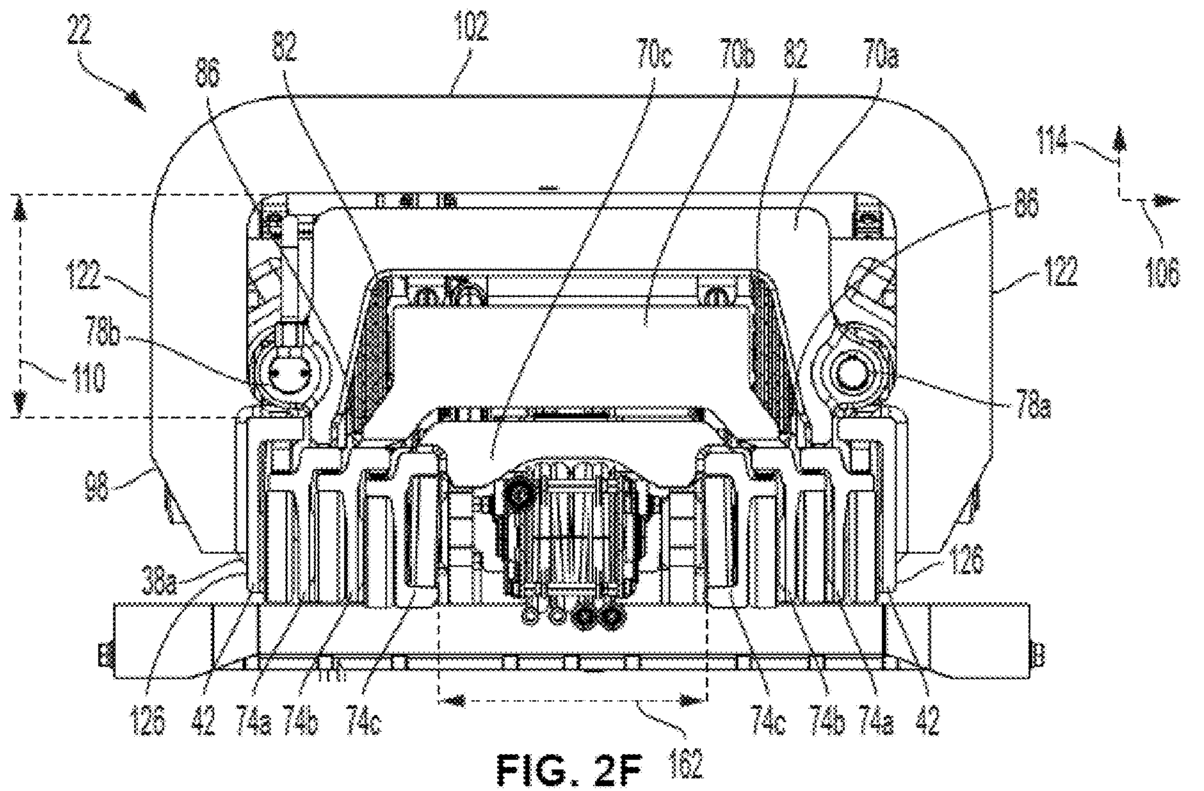

Mast 22 includes one or more sets of inner masts (e.g., 70*a*-70*c*), each including a pair of inner rails (e.g., 74*a*-74*c*) that is disposed between outer rails 42 and is configured to translate in vertical direction 54 relative to the outer rails (FIG. 2F). To illustrate, mast 22 can include a first inner mast 70*a* disposed within and translatable relative to outer mast 38*a*, a second inner mast 70*b* disposed within and translatable relative to first inner mast 70*a*, and a third inner mast 70*c* disposed within and translatable relative to second inner mast 70*b*. In this way, mast 22 can be a four-stage mast, with each of inner masts 70*a*-70*c* defining one of the stages and carriage 62 defining one of the stages. Such, however, is not required, as the present teachings can be applied to single-, double-, triple-, or more-stage masts.

For masts with at least one inner mast, like mast 22, lifting of inner mast 70*a* closest to outer mast 38*a* can be achieved by one or more (e.g., two, as shown) lift cylinders 78*a*, 78*b* coupled to the outer mast and the inner mast such that actuation of the lift cylinder(s) translates the inner mast relative to the outer mast. Inner masts 70*b* and 70*c* beyond inner mast 70*a* can be lifted by chains. To illustrate, mast 22, for each of its further inner masts 70*b* and 70*c*, can include one or more (e.g., two, as shown) chains 82 at least partially disposed around one or more pulleys 86 coupled to the mast adjacent to the further inner mast in an outer direction ("outer-adjacent mast"), where a first end of the chain(s) is coupled to the mast adjacent to the outer-adjacent mast in the outer direction and a second end of the chain(s) is coupled to the further inner mast. In this way, for each of further inner masts 70*b* and 70*c*, as the further inner mast's outer-adjacent mast is lifted, chain(s) 82 can cause the further inner mast to be lifted relative to the outer-adjacent mast (e.g., such that the upper end of the further inner mast is disposed above the upper end of its outer-adjacent mast). To illustrate, chain(s) 82 for lifting inner mast 70*b* can be coupled to inner mast 70*b*, disposed around pulley(s) 86 coupled to inner mast 70*a*, and coupled to outer mast 38*a*. Similarly, chain(s) for lifting inner mast 70*c* can be coupled to inner mast 70*c*, disposed around pulley(s) coupled to inner mast 70*b*, and coupled to inner mast 70*a*.

Outer mast 38*a* may therefore support loads well beyond its height, raising structural concerns. To promote the strength of mast 22, outer mast 38*a* can have a horizontal brace 98 coupled to and extending between outer rails 42. Horizontal brace 98 can be disposed closer to upper end 50 of outer mast 38*a* than to the outer mast's lower end 46; as shown, the horizontal brace is disposed at the outer mast's upper end. In this way, horizontal brace 98 can mitigate deflection of outer rails 42 when outer mast 38*a* supports a lifted load, thereby facilitating the outer mast's ability to support such lifting.

Figure 2G:
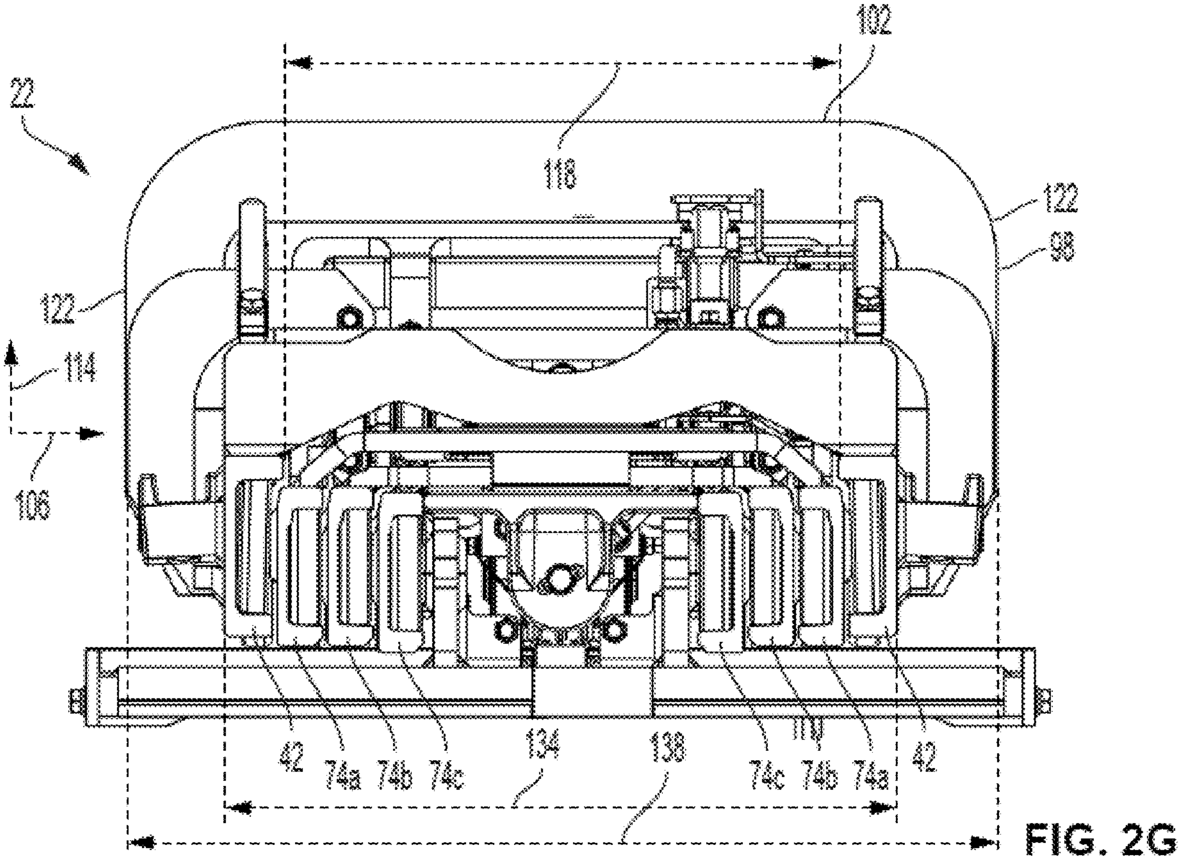
Figure 2H:
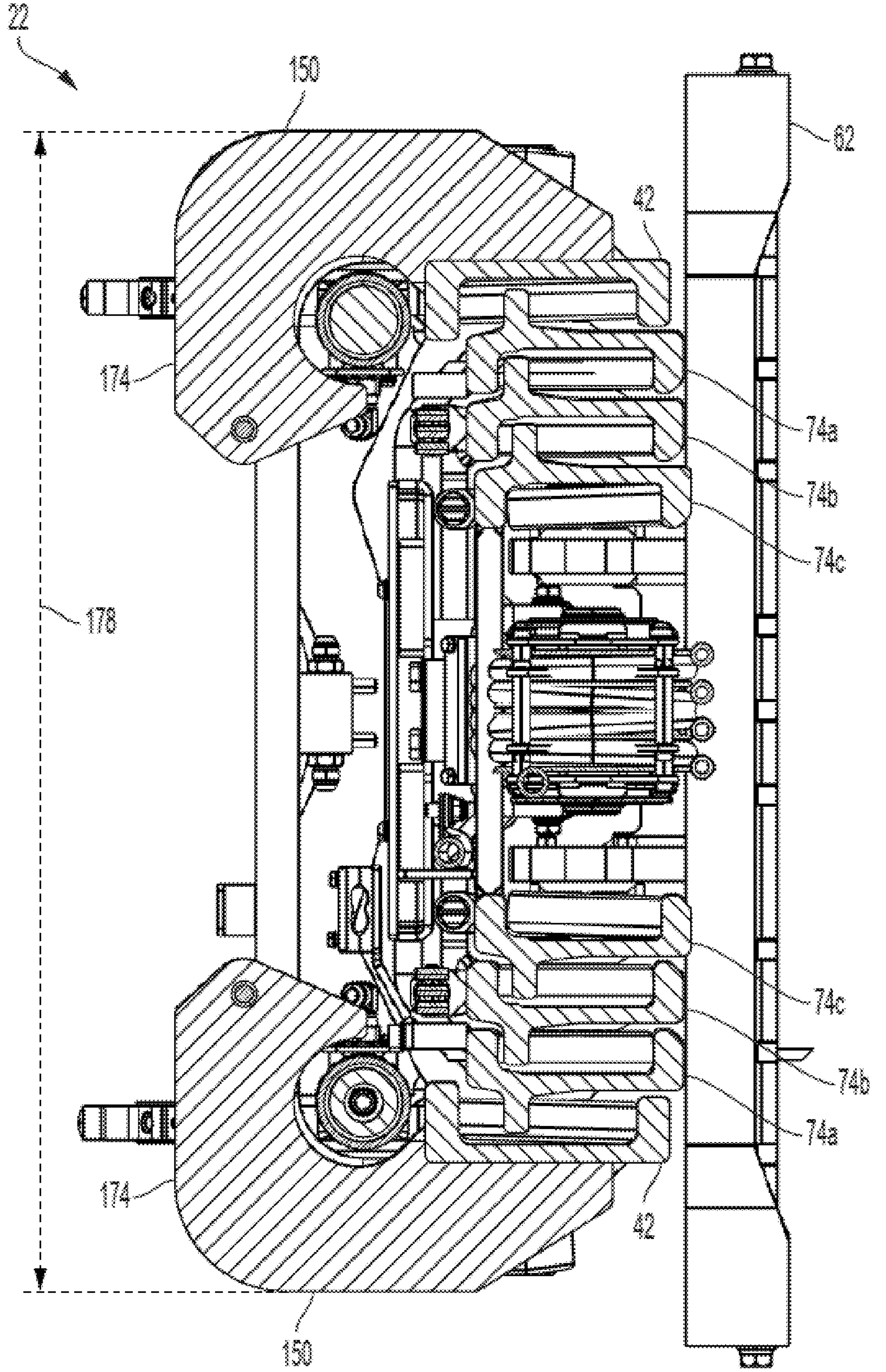
FIG. 2H is a cross-sectional top view of the mast of FIG. 2A, taken along line 2H-2H of FIG. 2B.

Lifting a load above outer mast 38*a*'s height can also pose concerns regarding an operator's ability to view the lifted load, especially with horizontal brace 98 extending between outer rails 42 at or near the outer mast's upper end 50. Horizontal brace 98 can be shaped and arranged to mitigate these visibility concerns. For example, horizontal brace 98 can include an offset segment 102 that extends in a horizontal direction 106 that is substantially perpendicular to vertical direction 54, where the offset segment is positioned rearward of outer rails 42. For example, a minimum distance 110, measured in a depthwise direction 114 that is substantially perpendicular to each of vertical and horizontal directions 54 and 106, between offset segment 102 and each of outer rails 42 can be greater than or equal to any one of, or between any two of, 20%, 25%, 30%, 35%, 40%, or 45% of a minimum distance 118, measured in the horizontal direction, between the outer rails (FIGS. 2F and 2G). This can promote an operator's ability to view a load between outer rails 42.

Horizontal brace 98's offset segment 102 can be connected to outer rails 42 via two outer segments 122 between which the offset segment extends, with each of the outer segments extending between the offset segment and a respective one of the outer rails. To provide space (e.g., for inner mast(s) 70*a*-70*c*) and promote horizontal brace 98's ability to prevent outward deflection of outer rails 42, each of outer segments 122 can be coupled to an outer surface 126 of the outer rail that faces away from the other of the outer rails. In this manner, outward deflection of each outer rail 42 can be toward—rather than away from—outer segment 122 coupled thereto, rendering the connection (e.g., weld) between horizontal brace 98 and the outer rails more resilient to breakage when a lifted load urges outward deflection of the outer rails. Furthermore, outer segments 122 can each have a strength-promoting size without extending past their respective outer rail 42 in horizontal direction 106 to an extent that would pose clearance problems. For example, width 138 of horizontal brace 98, measured in horizontal direction 106, can be defined between outermost edges of outer segments 122 and can be less than or equal to any one of, or between any two of, 15%, 20%, 25%, 30%, 35%, 40%, or 45% (e.g., between 20% and 40%) larger than a distance 134, measured in the horizontal direction, between outer surface 126 of a first one of outer rails 42 and the outer surface of a second one of the outer rails (FIG. 2G). Width 138 of horizontal brace 98 can be, for example, greater than or equal to any one of, or between any two of, 60, 65, 70, 75, 80, 85, 90, 95, or 100 centimeters (e.g., between 70 and 95 centimeters). And, in view of clearance concerns, width 138 of horizontal brace 98 can be similar to and/or less than or equal to width 142, measured in horizontal direction 106, of carriage 62 (FIG. 2C), optionally such that the carriage's width is within 15%, 14%, 13%, 12%, 11%, or 10% (e.g., within 13%) of the horizontal brace's width.

Horizontal brace 98 can also be relatively thin to mitigate its obstruction of an operator's view of a lifted load. For example, a thickness 146 of horizontal brace 98 (FIG. 2D) can be less than or equal to any one of, or between any two of, 15%, 14.5%, 14.0%, 13.5%, 13.0%, 12.5%, 12.0%, 11.5%, or 11.0% (e.g., less than or equal to 13%, such as between 11% and 13%) of minimum distance 118 between outer rails 42 (FIG. 2G), such as less than or equal to any one of, or between any two of, 8.0, 7.75, 7.5, 7.25, 7.0, 6.75, 6.50, 6.25, or 6.0 centimeters (e.g., less than or equal to 7.25 centimeters, such as between 6.0 and 7.25 centimeters).

Mast 22 can further include at least two auxiliary braces 150 and, for each of the auxiliary braces, one or more vertical braces (e.g., 154*a*, 154*b*, described below) extending between the auxiliary brace and horizontal brace 98, which can further promote the mast's strength, particularly when the mast includes inner masts 70*b* and 70*c* beyond the first inner mast 70*a*. In particular, each of auxiliary braces 150 can be coupled to a respective one of outer rails 42 and can be disposed below horizontal brace 98, optionally such that the auxiliary brace is still disposed closer to upper end 50 than to lower end 46. And each of chain(s) 82 that lift second inner mast 70*b* can be coupled to one of auxiliary braces 150 (and thus to outer rail 42 to which the auxiliary brace is coupled) such that the auxiliary braces can support the lifting of the second inner mast (and thus, indirectly, any further inner mast like third inner mast 70*c* that the second inner mast at least partially supports). With vertical braces (e.g., 154*a*, 154*b*) extending between auxiliary braces 150 and horizontal brace 98, the vertical and horizontal braces can aid the auxiliary braces' support for the lifting of second inner mast 70*b* and can thus contribute to mast 22's strength and robustness when lifting a load.

For visibility, auxiliary braces 150 can occupy only a small portion or remain outside of a view through the space defined between inner rails 74*c* of inner-most mast 70*c*, e.g., such that a minimum distance 158, measured in horizontal direction 106, between the auxiliary braces (FIG. 2B) is greater than or equal to any one of, or between any two of, 90%, 95%, 100%, 105%, 110%, or 115% (e.g., at least 100%) of a minimum distance 162, measured in the horizontal direction, between the inner rails of at least one of the pair of inner rails (e.g., of the inner rails of the inner-most mast) (FIG. 2F). Like outer segments 122 of horizontal brace 98, auxiliary braces 150—which can each have opposing upper and lower surfaces 166 and 170 and an edge 174 connecting the upper and lower surfaces—can have a strength-promoting size that nevertheless does not pose clearance problems, optionally such that a maximum distance 178, measured in horizontal direction 106, between the edge of a first one of the auxiliary braces and the edge of a second one of the auxiliary braces (FIG. 2C) is approximately the same as the horizontal brace's width 138 (FIG. 2G). For example, maximum distance 178 between edges 174 of auxiliary braces 150 can be less than or equal to any one of, or between any two of, 15%, 20%, 25%, 30%, 35%, 40%, or 45% (e.g., between 20% and 40%) larger than distance 134 between outer surfaces of outer rails 42, such as less than or equal to any one of, or between any two of, 60, 65, 70, 75, 80, 85, 90, 95, or 100 centimeters (e.g., between 70 and 95 centimeters). And, also like horizontal brace 98's width 138, maximum distance 178 between edges 174 of auxiliary braces 150 can be similar to and/or less than or equal to width 142 of carriage 62, optionally such that the carriage's width is within 15%, 14%, 13%, 12%, 11%, or 10% (e.g., within 13%) of the maximum distance between the auxiliary braces' edges.

To further promote visibility, each of auxiliary braces 150 need not extend rearward in depthwise direction 114 to the same extent as offset segment 102 of horizontal brace 98. For example, taken in depthwise direction 114, a portion of edge of 174 of each of auxiliary braces 150 that is furthest from outer rail 42 to which the auxiliary brace is coupled can be disposed closer to the outer rail than is offset segment 102 (FIGS. 2D and 2E). Additionally, each of auxiliary braces 150 can be positioned relatively close to upper end 50 of outer mast 38*a* and thus to horizontal brace 98, which can place the auxiliary brace further outside of an operator's view and yield a high-up mounting point for chain(s) 82 that are used to lift second inner mast 70*b*. This can reduce the amount of chain needed to—after passing around pulley(s) 86 coupled to first inner mast 70—reach auxiliary brace 150. For example, for each of auxiliary braces 150, a distance 182, measured in vertical direction 54, between a lower surface of horizontal brace 98 and upper surface 166 of auxiliary brace can be less than or equal to any one of, or between any two of, 20%, 17.5%, 15%, 12.5%, 10%, 7.5%, or 5% (e.g., between 5% and 15%) of a height 186, measured in vertical direction 54, of each of outer rails 42, such as less than or equal to any one of, or between any two of, 30, 29, 28, 27, 26, 25, 24, 23, 22, 21, 20, 19, 18, 17, or 16 centimeters (e.g., between 19 and 27 centimeters).

Referring additionally to FIGS. 3A-3E, vertical braces 154*a*, 154*b* can be shaped and extend between horizontal brace 98 and auxiliary braces 150 in a manner that promotes the strength of such a split configuration. As shown, for each of auxiliary braces 150, each of the vertical brace(s) coupled to the auxiliary brace can extend between upper surface 166 of the auxiliary brace (e.g., as opposed to the auxiliary brace's edge 174) and the lower surface of horizontal brace 98 (e.g., as opposed to the horizontal brace's edge), where the auxiliary brace's upper surface can face the horizontal brace's lower surface (e.g., where a line normal to the auxiliary brace's upper surface and a line normal to the horizontal brace's lower surface can each be substantially parallel with the vertical direction). This can facilitate the load transfer that vertical braces 154*a*, 154*b* effect between auxiliary braces 150 and horizontal brace 98. For example, at least a portion of the upward load that chain(s) 82 exert on auxiliary braces 150 when lifting second inner mast 70*b* can be transmitted to horizontal brace 98 via vertical braces 154*a*, 154*b* with little, if any, shear force exerted on the connections (e.g., welds) between the vertical braces and the auxiliary braces' upper surfaces 166. This can promote the robustness of the structural support vertical braces 154*a*, 154*b* and horizontal brace 98 provide for auxiliary braces 150.

Additionally, for each of auxiliary braces 150, vertical brace(s) (e.g., 154*a*, 154*b*, and/or the like) can include at least a first vertical brace 154*a* whose geometry mitigates stress concentrations when chain 82 coupled to the auxiliary brace exerts a load thereon. A brace positioned at or near where first vertical brace 154*a* is positioned (e.g., closer to edge 174 of auxiliary brace 150 than to outer rail 42 to which the auxiliary brace is coupled) and shaped as a prism with a convex quadrilateral base (e.g., a rectangular or square prism) could yield undesirable stress concentrations. First vertical brace 154*a* can thus have a different geometry. As shown, first vertical brace 154*a* can have opposing inner and outer surfaces 190 and 194 (which can each be planar) and inner and outer edges 198 and 202 that can each connect the inner surface to the outer surface, where the inner edge is disposed closer to the other of the auxiliary braces than is the outer edge. Inner and outer edges 198 and 202 can each have a first segment 206 and a second segment 210, where the first segment can extend between horizontal brace 98 and the second segment. With specific reference to FIGS. 3B-3D, for each of inner and outer edges 198 and 202, first segment 206 can extend in a direction that is substantially parallel to vertical direction 54, e.g., such that a first line 214 that extends from an upper end of the first segment to a lower end of the first segment (which can be an upper end of second segment 210) is substantially parallel to the vertical direction. And, for each of inner and outer edges 198 and 202, second segment 210 can be angularly disposed relative to first segment 206 to extend inwardly and downwardly such that a lower end of the second segment is disposed closer to each of auxiliary braces 150 than is an upper end of the second segment, preferably such that the second segment extends in a direction that is angularly disposed relative to the vertical direction by an angle 218 that is greater than or equal to any one of, or between any two of, 20°, 30°, 40°, 50°, 60°, or 70° (e.g., between 20° and) 70°. That is, a second line 222 that extends between the upper and lower ends of second segment 210 can be angularly disposed relative to first line 214 by such an angle 218.

The direction in which second segment 210 of inner edge 198 extends (and second line 222 extending between the inner edge's second segment's upper and lower ends) can be within 30°, 25°, 20°, 15°, 10°, or 5° of parallel to the direction in which the second segment of outer edge 202 extends (and to the second line extending between the outer edge's second segment's upper and lower ends). As an illustration, first vertical brace 154*a* can be a right prism in which first and second segments 206 and 210 of each of the first vertical brace's inner and outer edges 198 and 202 can each be planar and the right prism's base (e.g., each of the first vertical brace's inner and outer surfaces 190 and 194) can be a concave polygon (e.g., having at least six sides). Such a geometry can mitigate stress concentrations and thus promote mast 22's structural integrity when lifting a load.

To further mitigate stress concentrations, as shown, for each of auxiliary braces 150, first vertical brace 154*a* can be shaped such that first segments 206 of inner and outer edges 198, 202 can have different lengths, and second segments 210 of the inner and outer edges can have different lengths. For example, first segment 206 of outer edge 202 can be longer than the first segment of inner edge 148, such as with the outer edge's first segment having a length that is at least 10%, 15%, 20%, 25%, 30%, 35%, or 40% (e.g., at least 30%) larger than a length of the inner edge's first segment. As an illustration, the length of outer edge 202's first segment 206 can be greater than or equal to any one of, or between any two of, 12, 12.5, 13, 13.5, 14, 14.5, 15, 15.5, 16, 16.5, 17, 17.5, 18, 18.5, 19, 19.5, or 20 centimeters (e.g., between 14 and 18 centimeters) and the length of inner edge 198's first segment can be less than or equal to any one of, or between any two of, 16, 15.5, 15, 14.5, 14, 13.5, 13, 12.5, 12, 11.5, 11, 10.5, 10, 9.5, 9, 8.5, or 8 centimeters (e.g., between 10 and 14 centimeters). By contrast, second segment 210 of inner edge 198 can be longer than the second segment of outer edge 202, such as with the inner edge's second segment having a length that is at least 10%, 12.5%, 15%, 17.5%, 20%, 22.5%, 25%, or 27.5% (e.g., at least 12.5%) larger than a length of outer edge 202's second segment 210. As an illustration, the length of inner edge 198's second segment 210 can be greater than or equal to any one of, or between any two of, 5.5, 6, 6.5, 7, 7.5, 8, 8.5, 9, 9.5, 10, 10.5, 11, or 11.5 centimeters (e.g., between 7 and 10 centimeters) and the length of outer edge 202's second segment can be less than or equal to any one of, or between any two of, 10, 9.5, 9, 8.5, 8, 7.5, 7, 6.5, 6, 5.5, 5, 4.5, or 4 centimeters (e.g., between 5.5 and 8.5 centimeters).

While outer edge 202 of first vertical brace 154*a* can, in some embodiments, only include first and second segments 206 and 210, with the second segment extending from the first segment to upper surface 166 of auxiliary brace 150, the first vertical brace's inner edge 198 can include—in addition to the first and second segments—a third segment 224, where the inner edge's second segment can extend between its first and third segments, and the third segment can extend from the inner edge's second segment to the auxiliary brace's upper surface. Third segment 224 of inner edge 198 can extend in a direction that is substantially parallel with vertical direction 54, e.g., a third line extending from an upper end of the third segment to a lower end of the third segment can be substantially parallel with the vertical direction. Third segment 224 of inner edge 198 can be relatively short compared to the inner edge's first and second segments 206 and 210; for example, a length of the third segment can be less than or equal to any one of, or between any two of, 40%, 35%, 30%, 25%, 20%, or 15% of each of the lengths of the first and second segments (e.g., less than or equal to 35% of the first segment's length and/or less than or equal to 25% of the second segment's length), such as less than or equal to any one of, or between any two of, 4.5, 4.25, 4, 3.75, 3.5, 3.25, 3, 2.75, 2.5, 2.25, 2, 1.75, 1.5, 1.25, or 1 centimeters (e.g., between 1.5 and 3.5 centimeters).

For each of auxiliary braces 150, first vertical brace 154*a* extending from the auxiliary brace to horizontal brace 98 can have a strength-promoting size to facilitate its ability to transfer and withstand loads. To illustrate, a width 266 of first vertical brace 154*a*, measured between the first vertical brace's inner and outer edges 198 and 202 in a direction that is substantially perpendicular to vertical direction 54, can be greater than or equal to any one of, or between any two of, 25%, 30%, 35%, 40%, 45%, or 50% of a distance 182, measured in the vertical direction, between the lower surface of horizontal brace 98 and upper surface 166 of auxiliary brace 150 to which the first vertical brace is coupled, such as greater than or equal to any one of, or between any two of, 7, 7.5, 8, 8.5, 9, 9.5, 10, 10.5, 11, 11.5, 12, 12.5, or 13 centimeters (e.g., between 8.5 and 11.5 centimeters). And a thickness 234 of first vertical brace 154*a* (FIG. 3E), measured between inner and outer surfaces 190 and 194 in a direction that is substantially perpendicular to vertical direction 54, can be greater than or equal to any one of, or between any two of, 10%, 15%, 20%, 25%, 30%, or 35% (e.g., between 20% and 30%) of the first vertical brace's width 226, such as greater than or equal to any one of, or between any two of, 1, 1.25, 1.5, 1.75, 2, 2.25, 2.5, 2.75, 3, 3.25, 3.5, 3.75, or 4 centimeters (e.g., between 1.75 and 3.25 centimeters).

Figure 3A:
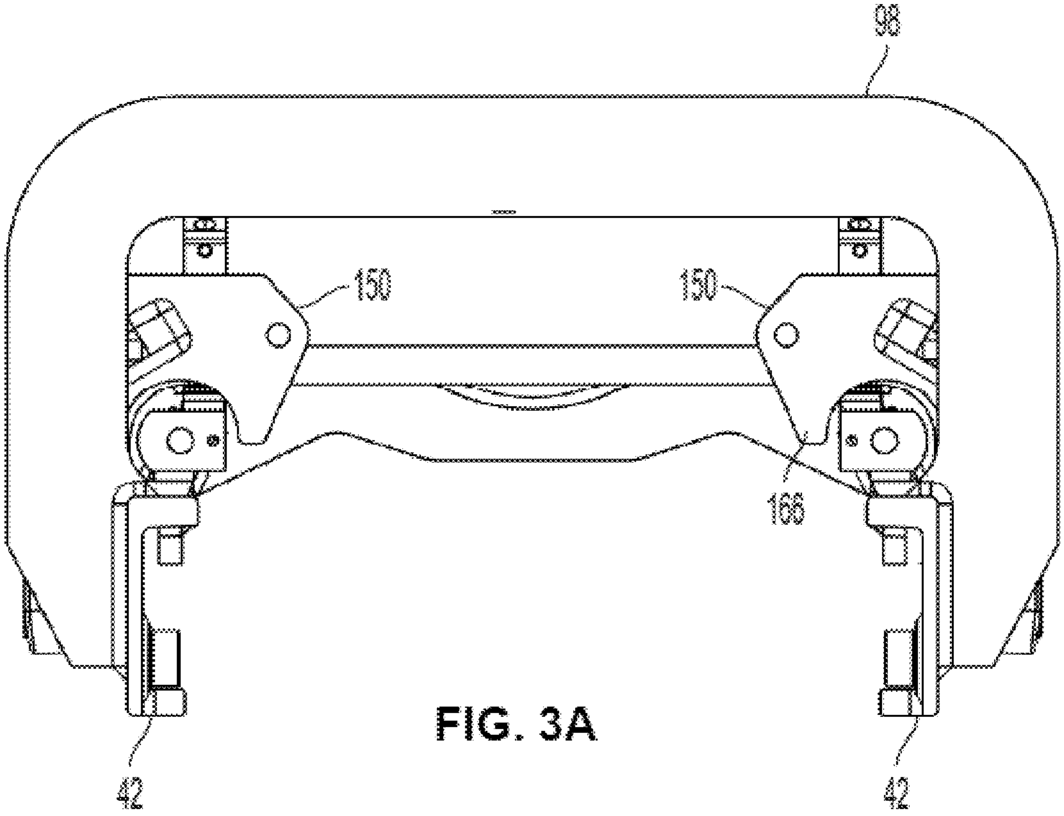
FIG. 3A is a top view showing the outer mast of FIG. 2A's mast.
Figure 3B:
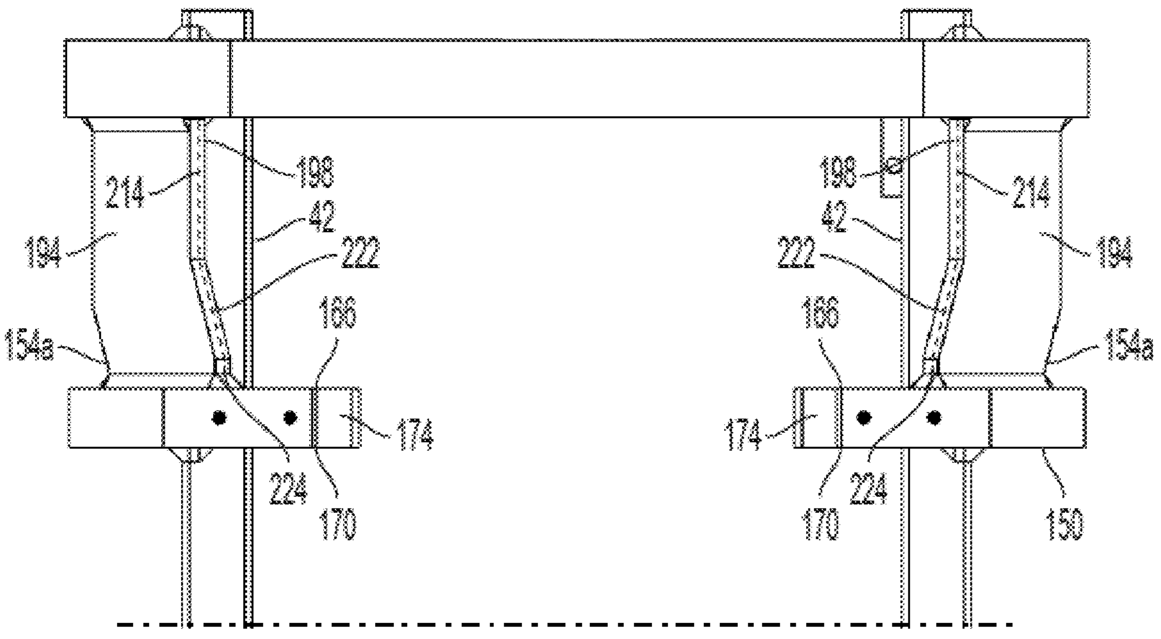
FIGS. 3B and 3C are partial rear and partial front views, respectively, of the outer mast of FIG. 3A.
Figure 3C:
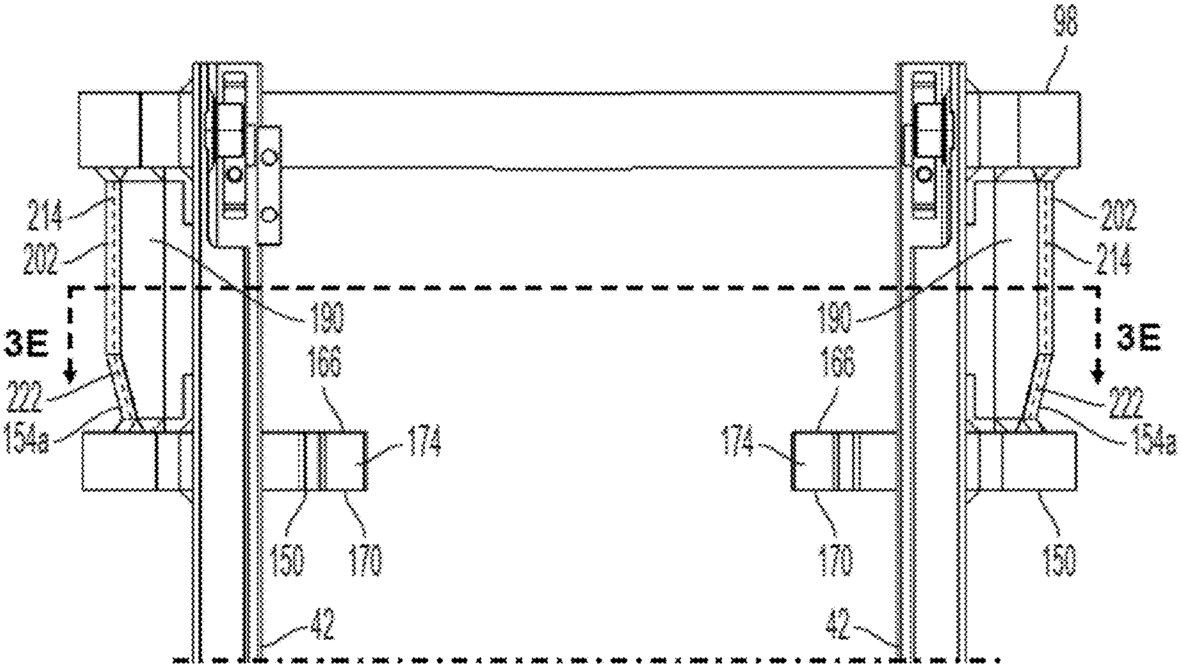
Figure 3D:
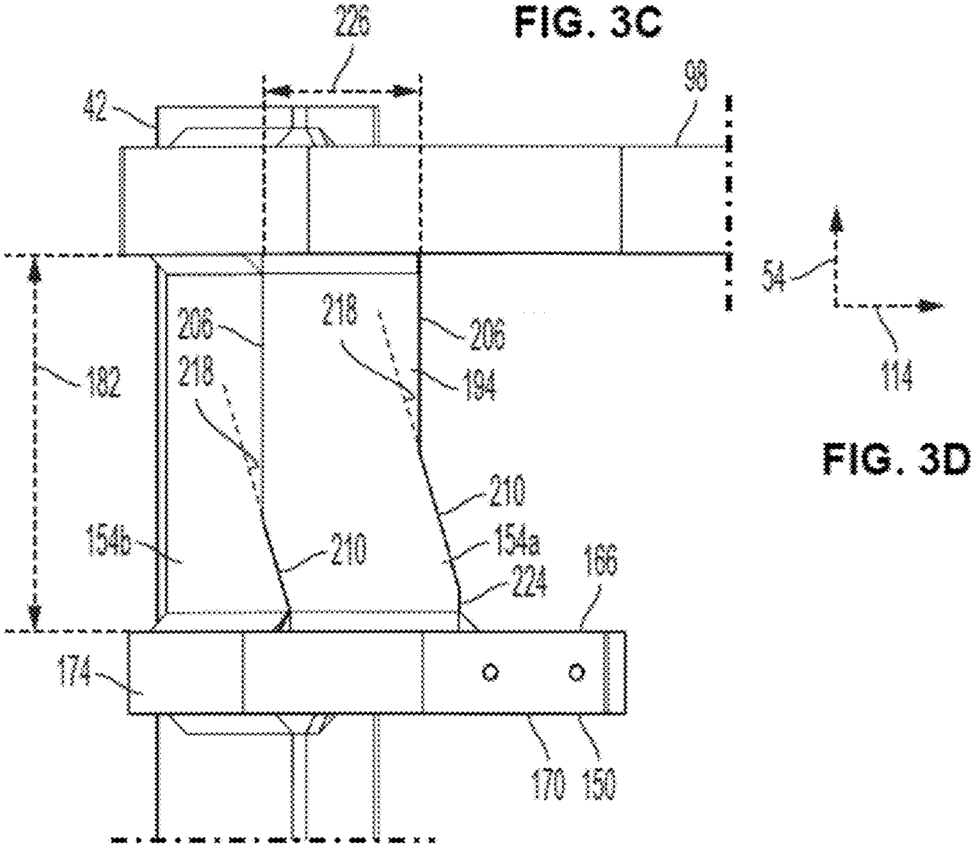
FIG. 3D is a partial view of the outer mast of FIG. 3A, taken perpendicular to an outer face of a vertical brace that connects a horizontal brace of the outer mast to an auxiliary brace of the outer mast.
Figure 3E:
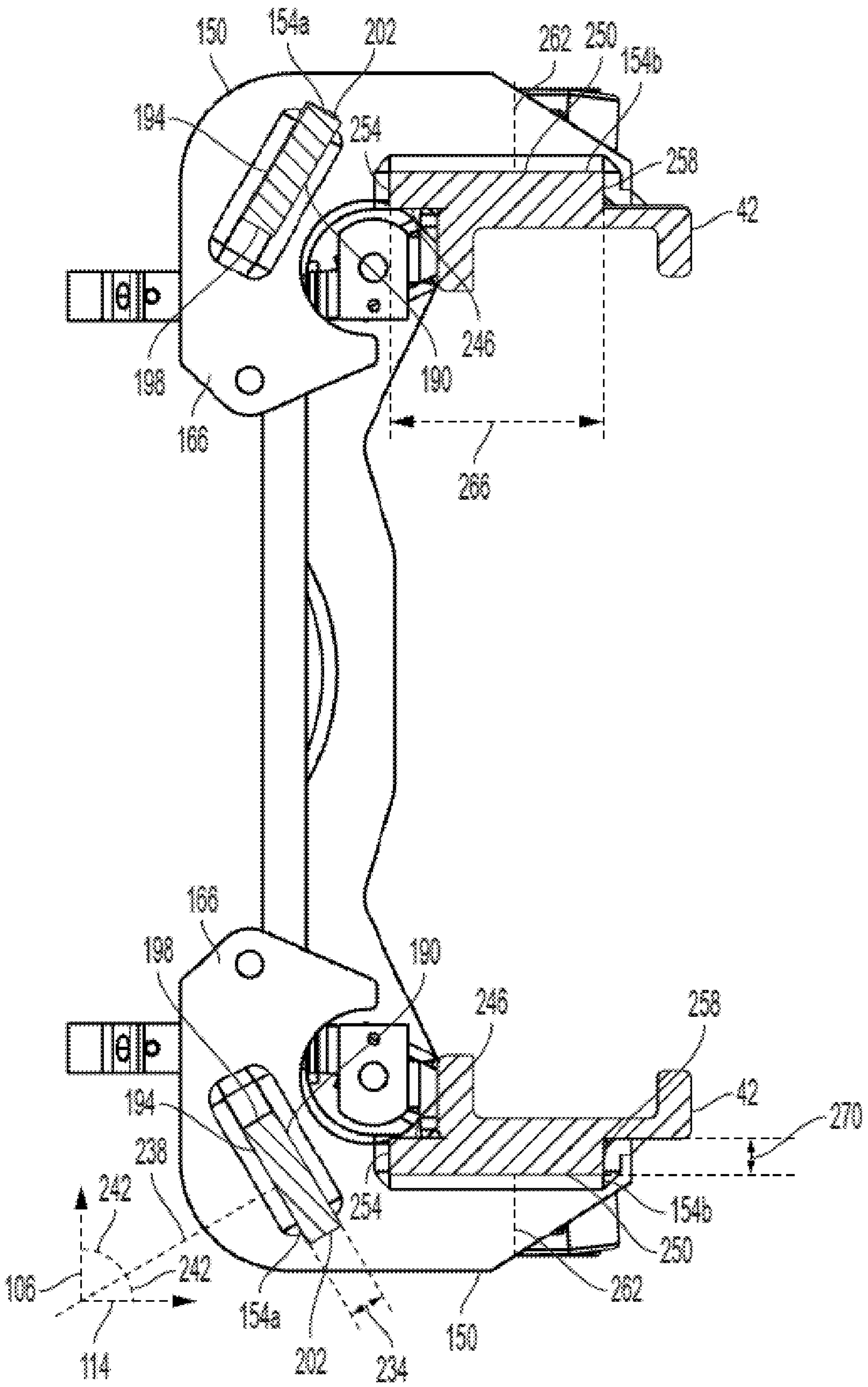
FIG. 3E is a cross-sectional top view of the outer mast of FIG. 3A, taken along line 3E-3E of FIG. 3C.

Each first vertical brace 154*a* can also have an angular positioning that, in conjunction with its geometry, further mitigates stress concentrations. For example, for each of auxiliary braces 150, a line 238 that is normal to outer surface 194 of first vertical brace 154*a* that is coupled to the auxiliary brace can be angularly disposed relative to each of horizontal and depthwise directions 106, 114, such as by an angle 242 that is greater than or equal to any one of, or between any two of, 15°, 20°, 25°, 30°, 35°, 40°, 45°, 50°, 60°, or 65° (e.g., at least 20° relative to the horizontal direction and at least 40°, relative to the depthwise direction) (FIG. 3E).

For each of auxiliary braces 150, the vertical brace(s) can also include a second vertical brace 154*b* that can be disposed closer to outer rail 42 to which the auxiliary brace is coupled than is first vertical brace 154*a*, which can provide support for and thus strengthen the auxiliary brace at a position closer to the outer rail when mast 22 is lifting a load. For example, as shown vertical brace 154*b*—which can have opposing inner and outer surfaces 246 and 250 and inner and outer edges 254 and 258 that each connect the second vertical brace's inner and outer surfaces—can be disposed along outer rail 42 such that the vertical brace's inner surface is coupled to the outer rail (e.g., to the outer rail's outer surface 126). As arranged, a line 262 that is normal to outer surface 250 of second vertical brace 154*b* can be substantially parallel with horizontal direction 106, and inner and outer edges 254 and 258 of the second vertical brace can each extend in a direction that is substantially parallel with vertical direction 54. Second vertical brace 154*b* can have a simpler shape than first vertical brace 154*a*, which—with its near-outer-rail-positioning—can still suitably strengthen auxiliary brace 150 without problematic stress concentrations while also rendering the second vertical brace easier to manufacture. For example, inner and outer surfaces 246 and 250 of second vertical brace 154*b* can each be rectangular and the second vertical brace's vertically-extending inner and outer edges 254 and 258 can each be planar, e.g., the second vertical brace can be a rectangular prism.

Each second vertical brace 154*b* can be sized to have sufficient strength to transfer at least some of the load chain 82 exerts on auxiliary brace 150 to which the second vertical brace is coupled when mast 22 lifts a load. For example, a width 266 of second vertical brace 154*b*, measured between inner and outer edges 254 and 258 in a direction that is substantially perpendicular to vertical direction 54 (e.g., and is substantially parallel with depthwise direction 114) can be greater than or equal to any one of, or between any two of, 30%, 35%, 40%, 45%, 50%, 55%, 60%, 65%, 70%, 75%, or 80% (e.g., between 55% and 80%) of distance 182, such as greater than or equal to any one of, or between any two of, 12, 12.5, 13, 13.5, 14, 14.5, 15, 15.5, 16, 16.5, 17, 17.5, or 18 centimeters (e.g., between 13.5 and 16.5 centimeters). And a thickness 270 of second vertical brace 154*b*, measured between the second vertical brace's inner and outer surfaces 246 and 250 in a direction that is substantially perpendicular to vertical direction 54 (e.g., and is substantially parallel with horizontal direction 106) can be greater than or equal to any one of, or between any two of, 5%, 10%, 15%, 20%, 25%, or 30%, (e.g., between 5% and 15%) of the second vertical brace's width 266, such as greater than or equal to any one of, or between any two of, 1, 1.25, 1.5, 1.75, 2, 2.25, 2.5, 2.75, 3, 3.25, 3.5, 3.75, or 4 centimeters (e.g., between 1.75 and 3.25 centimeters).

Referring additionally to FIGS. 4A-5, shown is a lift cylinder 78*a* of mast 22. Lift cylinder 78*a* includes a cylinder body 286 extending between a lower end 290 and an upper end 294, and a rod 298*a* that is extendable from the upper end of the cylinder body in response to actuation of the lift cylinder. To actuate lift cylinder 78*a*, hydraulic fluid can be flowed into cylinder body 286 through a fitting 302 coupled to lower end 290 of the cylinder body, and a pressure of the hydraulic fluid can act on rod 298*a*, causing the rod to extend from upper end 294 of the cylinder body. Lower end 290 of cylinder body 286 can be coupled to outer mast 38*a*, and rod 298*a* can be coupled to first inner mast 70*a* such that actuation of lift cylinder 78*a* causes the first inner mast to translate relative to the outer mast. As shown, lift cylinder 78*a* is a single-acting lift cylinder in which, for example, hydraulic fluid is directed into cylinder body 286 through fitting 302 to extend rod 298*a* from cylinder body 286, and the rod can be retracted into the cylinder body by the weight of the inner mast(s) (e.g., 70*a*-70*c*) and any load lifted thereby, during which such fluid can flow out of the cylinder body through the fitting. In other embodiments, a lift cylinder (e.g., 78*a*) can be a double-acting lift cylinder, with, for example, a piston separating its cylinder body (e.g., 286) into upper and lower chambers; hydraulic fluid can be directed into the upper and lower chambers (e.g., via distinct fittings) to retract and extend, respectively, the lift cylinder's rod (e.g., 298*a*).

FIGS. 6A-7 depict another lift cylinder 78*b* of mast 22. Lift cylinders 78*a* and 78*b* can be coupled to outer mast 38*a* and inner mast 70*a* on opposing sides of mast 22. Lift cylinder 78*b* can be substantially similar to lift cylinder 78*a*, with the primary exception described below. As shown, rod 298*b* of lift cylinder 78*b* can include a passageway 306 through which hydraulic fluid directed into cylinder body 286 (e.g., via fitting 302) can flow out of the lift cylinder. Passageway 306 can facilitate sequencing of mast 22's stages. To illustrate, hydraulic fluid can be flowed through passageway 306 of lift cylinder 78*b* and directed to free lift cylinder 66, which due to, e.g., having a larger rod surface area upon which a pressure of the hydraulic fluid acts than lift cylinder 78*b* and/or lifting less weight than lift cylinder 78*b* (which must lift the inner mast(s) (e.g., 70*a*-70*c*) as well as the free lift cylinder coupled thereto), may actuate before lift cylinder 78*b*. Once free lift cylinder 66 is extended, hydraulic fluid pressure in cylinder body 286 can build to cause actuation of lift cylinder 78*b*. In some instances, such functionality can be facilitated by one or more valves (e.g., check valve(s)) positioned within passageway 306, between the passageway and free lift cylinder 66, within the free lift cylinder, and/or the like. In at least this way, mast 22 can allow for translation of carriage 62 relative to the innermost mast (e.g., 70*c*) via actuation of free lift cylinder 66 across most—up to and including all—of the carriage's range of movement relative to the innermost mast before any of the inner masts (e.g., 70*a*-70*c*) are lifted relative to outer mast 38*a* via lift cylinders 78*a*, 78*b*. This functionality can also be achieved at minimal additional cost and complexity; to illustrate, with the above arrangement, a common pressure source is used to lift both carriage 62 and the inner masts (e.g., 70*a*-70*c*).

Figure 8A:
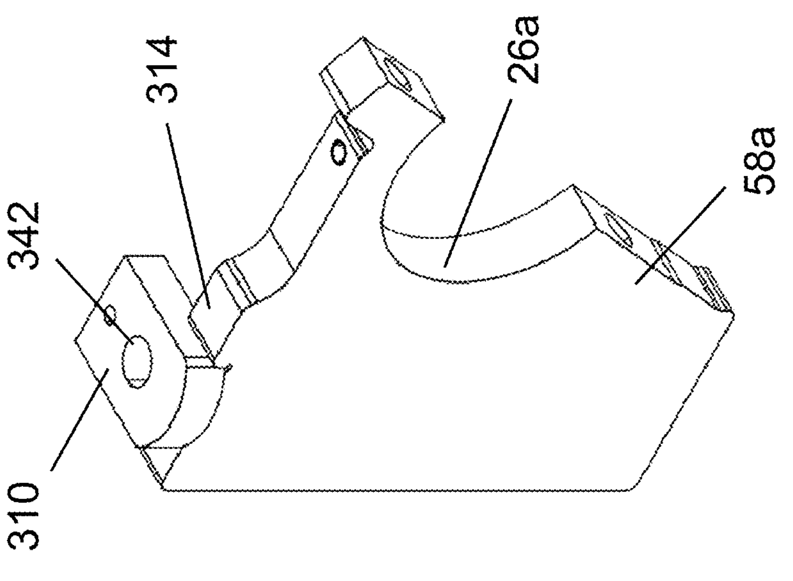
FIG. 8A is a perspective view of one of the mast mounts and a lift cylinder mount of FIG. 2A's mast.
Figure 8B:
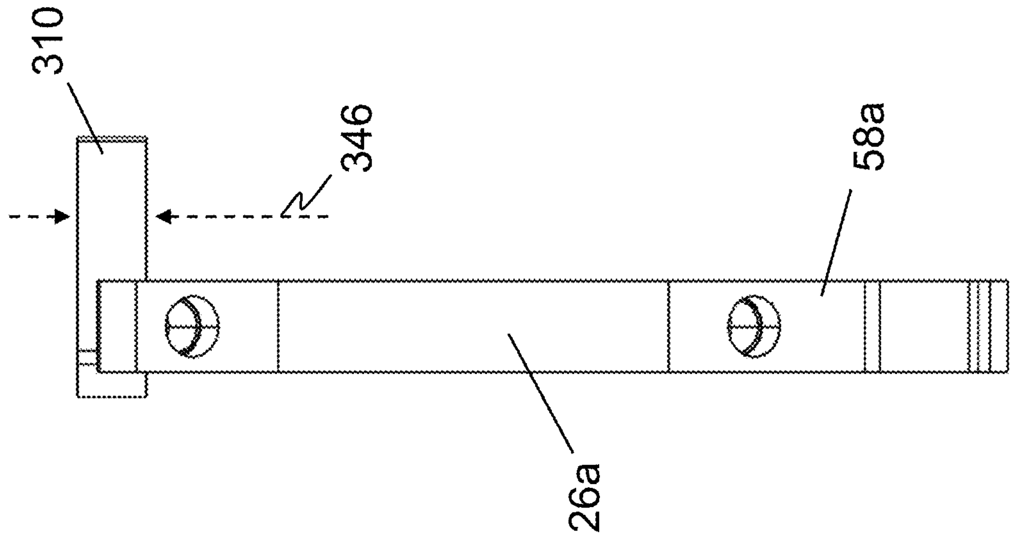
FIGS. 8B-8G are rear, front, left side, right side, top, and bottom views, respectively, of the mast mount and the lift cylinder mount of FIG. 8A.
Figure 8C:
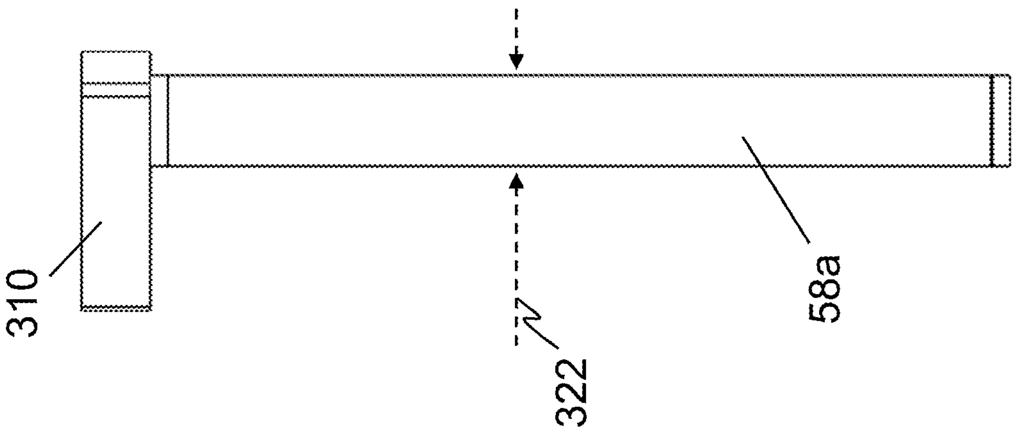
Figure 8D:
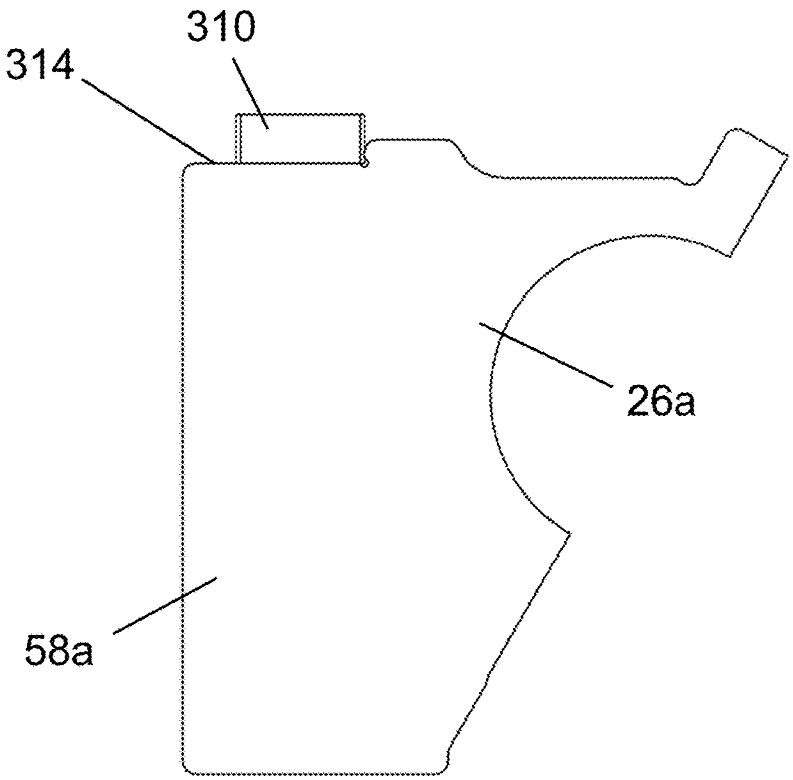
Figure 8E:
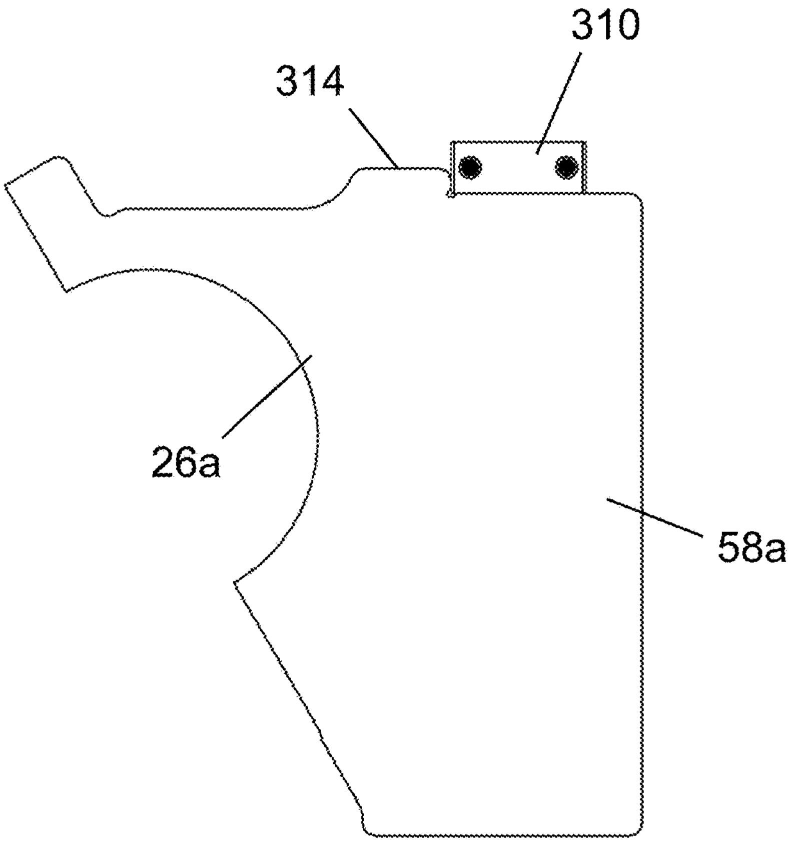
Figure 8F:
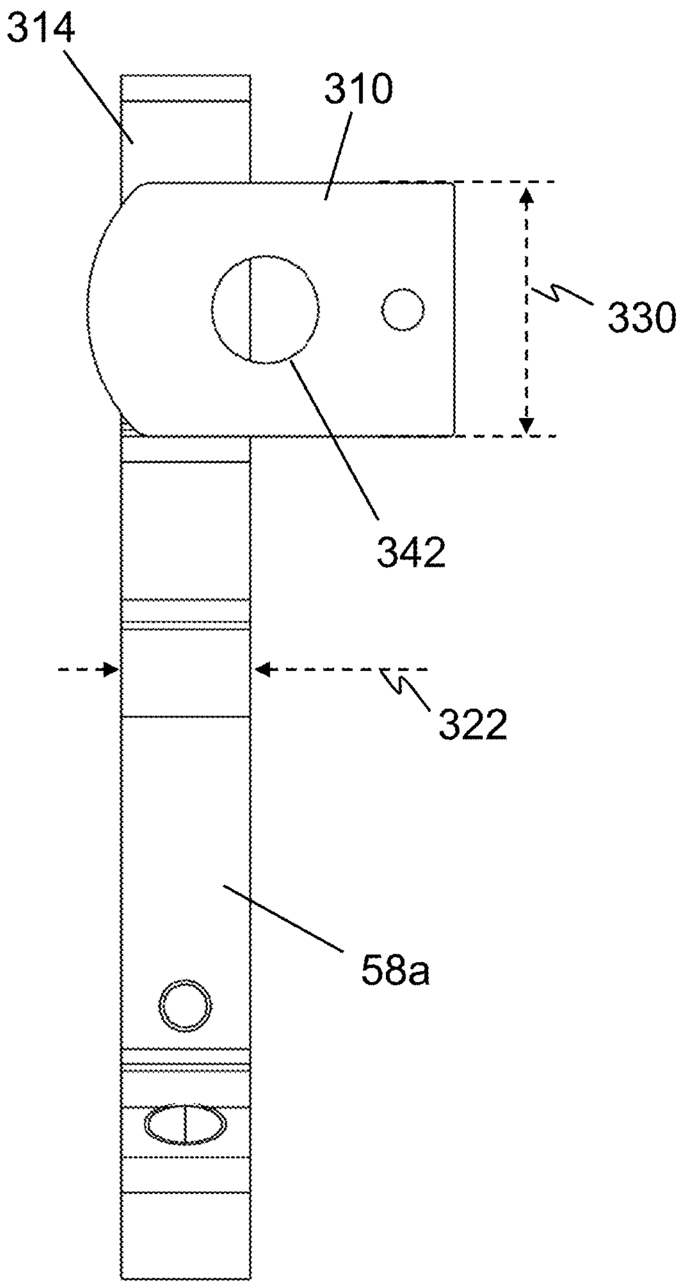
Figure 8G:
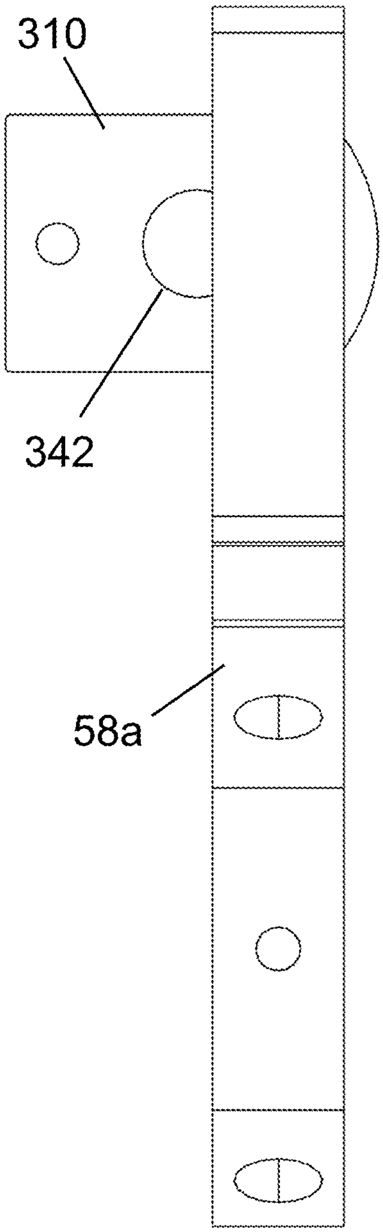
Figure 9:
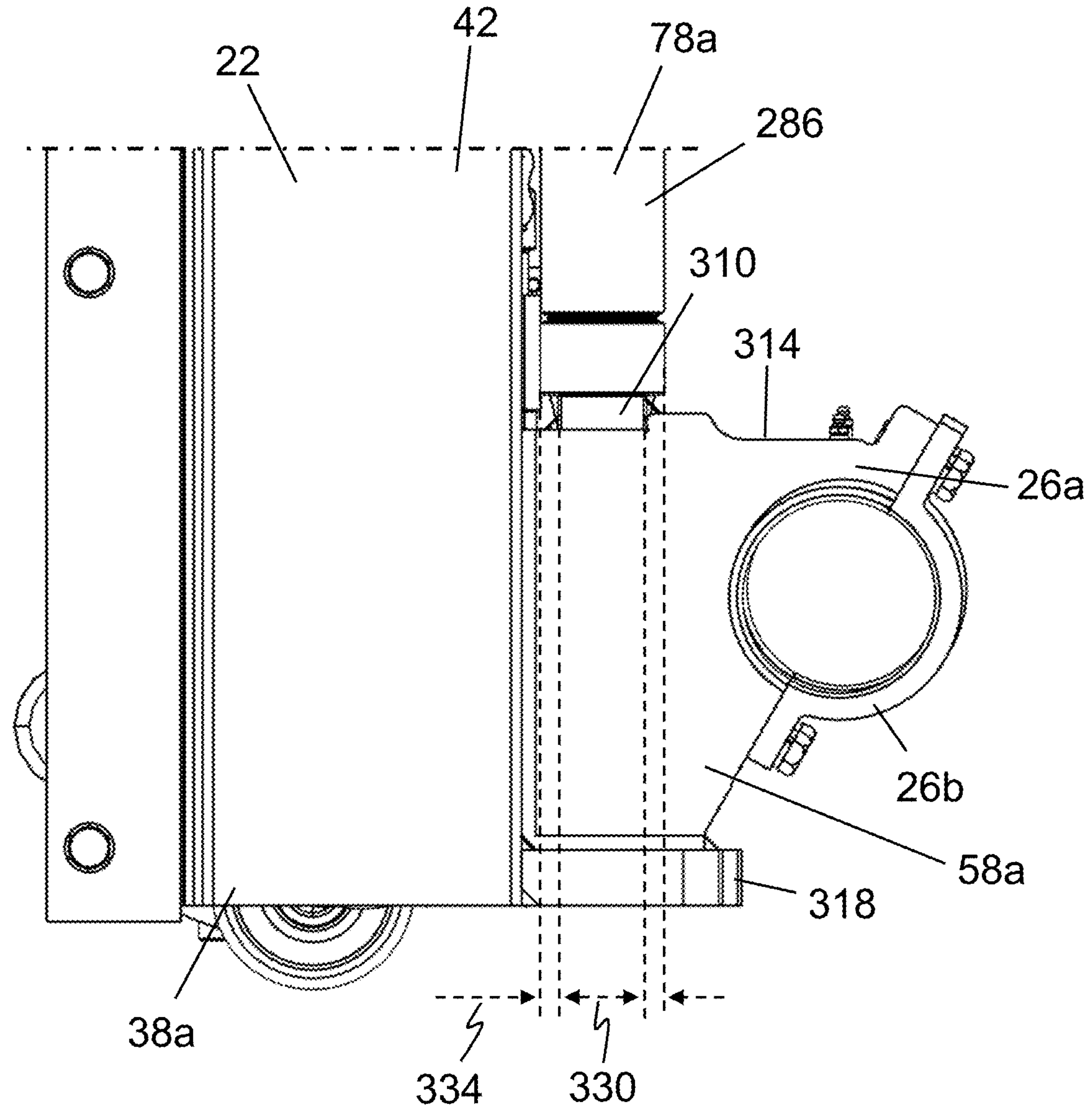
FIG. 9 is a partial left side view of the mast of FIG. 2A.
Figure 10A:
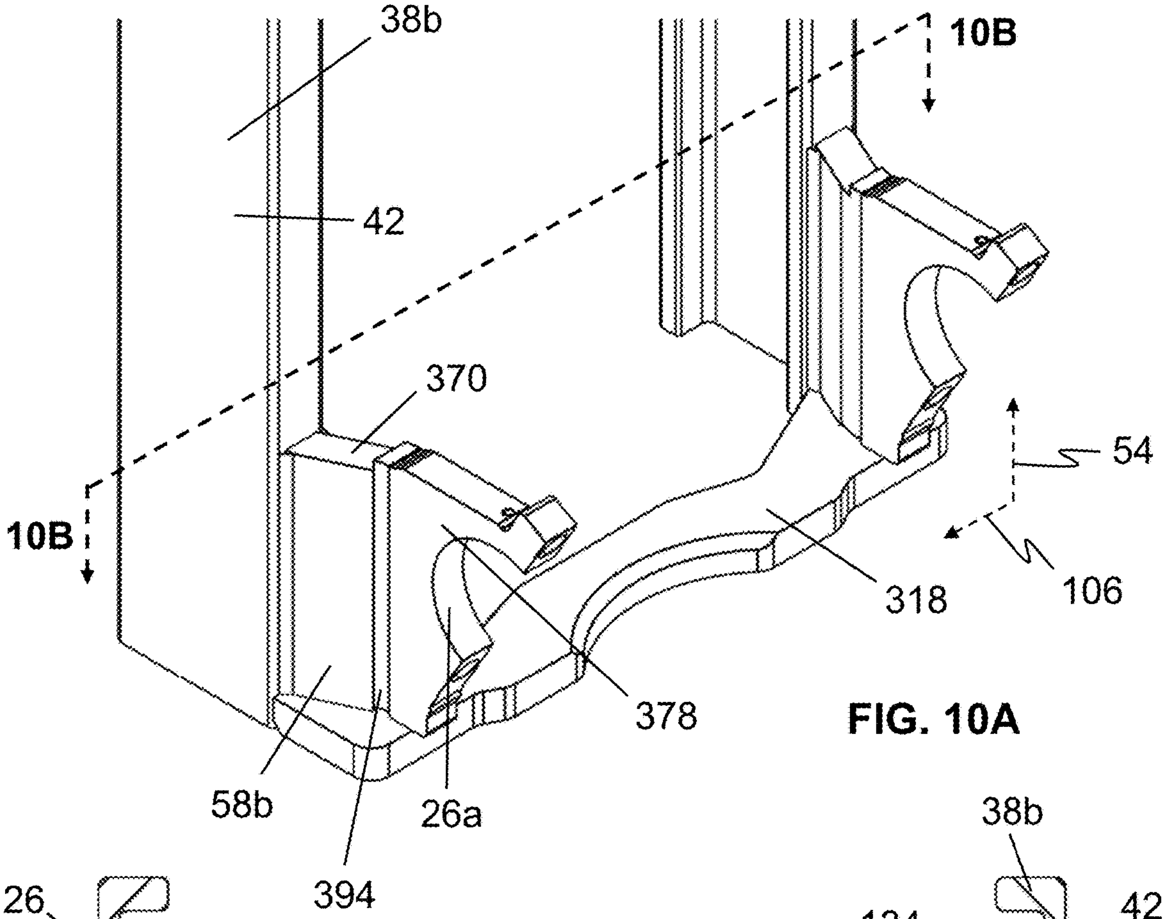
FIG. 10A is a partial perspective view an outer mast and mast mounts configured to couple the outer mast to a material handling vehicle.
Figure 10B:
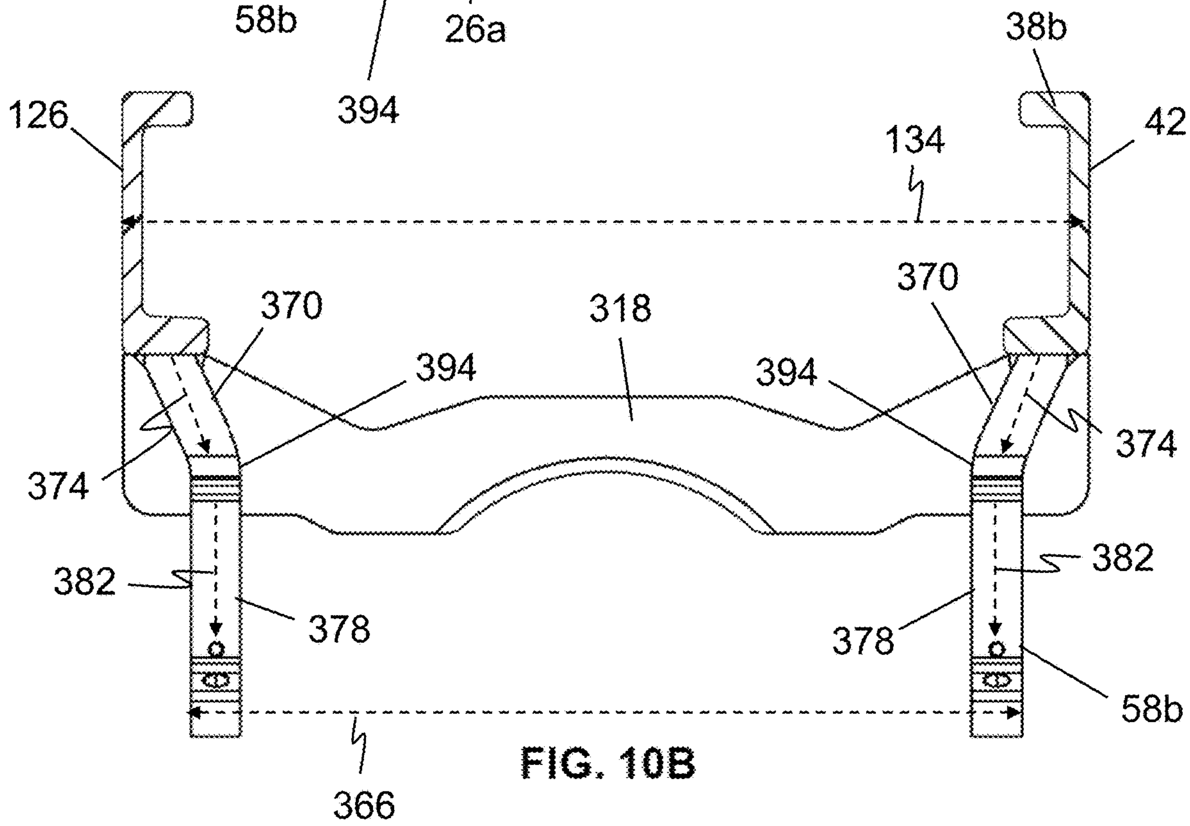
FIG. 10B is a cross-sectional top view of the outer mast and mast mounts of FIG. 10A, taken along line 10B-10B of FIG. 10A.

Referring additionally to FIGS. 8A-9, to couple lift cylinders 78*a*, 78*b* to outer rails 42, mast 22 includes lift cylinder mounts 310. As shown, lift cylinder mounts 310 are each coupled (e.g., welded) to one of mast supports 58*a*, and more particularly, to an upper surface 314 thereof. In mast 22, each of lift cylinder mounts 310 is coupled to upper surface 314 of its mast support 58*a* such that the lift cylinder mount extends completely across the upper surface between opposing sides of the mast support. In one or both of these ways, mast supports 58*a* can more effectively transmit loads from lift cylinders 78*a*, 78*b*, which lift each of inner mast(s) (e.g., 70*a*-70*c*) and any load carried thereby, onto material handling vehicle 10's axle 18, such as in a way that mitigates bending moments. Enhancing such support, mast 22 can include a brace 318 (FIGS. 5 and 7, also shown in FIGS. 2A and 2B) extending between outer rails 42 at a lower end 46 of outer mast 38*a* to which each of mast supports 58*a* can be coupled (e.g., welded).

For each of mast supports 58*a*, the portion of the mast support coupled (e.g., welded) to its outer mast rail 42 can have a substantially constant thickness 322; indeed, the mast support in general can have a substantially constant thickness 322. To illustrate, a thickness 322 of each of mast supports 58*a* can be greater than or equal to any one of, or between any two of, 2.0, 2.5, 3.0, 3.5, 4.0, 4.5, or 5.0 cm. Each of mast supports 58*a* can comprise a plate that defines upper surface 314 to which its lift cylinder mount 310 is coupled as well as axle mount portion 26*a*.

Positioning lift cylinder mounts 310 on upper surfaces 314 of mast supports 58*a* can also facilitate placement of lift cylinders 78*a*, 78*b* closer to outer rails 42. To illustrate, for each of lift cylinder mounts 310, no portion of its mast support 58*a* extending between the lift cylinder mount and outer rail 42 to which the mast support is coupled extends above the lift cylinder mount, above any portion of cylinder body 286 of the lift cylinder coupled thereto, and/or above a protrusion (e.g., 338, described below) that couples the lift cylinder to the lift cylinder mount (FIG. 9). Further, no braces, plates, gussets, or other structures that join mast supports 58*a* to their respective outer rails 42 (of which mast 22 includes none) extend above the lift cylinder mount. Thus, mast supports 58*a* can provide adequate support for lift cylinder mounts 310 and lift cylinders 78*a*, 78*b* mounted thereon, without obstructing space between the lift cylinder mounts or the lift cylinders and outer rails 42. This is advantageous, as close-spacing between lift cylinders 78*a*, 78*b* and outer rails 42 can reduce mast 22's front overhang, or the horizontal distance to which the mast extends from material handling vehicle 10's axle 18, which can, in turn, reduce the material handling vehicle's turning radius, reduce bending loads borne by the material handling vehicle when mast 22 lifts a load, and/or the like. In a similar vein, close-spacing between lift cylinders 78*a*, 78*b* can also mitigate interference with components of material handling vehicle 10, such as its brakes 326 (FIG. 1), which might otherwise require an increase in mast 22's front overhang.

Lift cylinder mounts 310, too, can facilitate close-spacing between respective lift cylinders 78*a*, 78*b* mounted thereto and outer rails 42. To illustrate, for each of lift cylinder mounts 310, cylinder body 286 of its supported lift cylinder is disposed closer to its outer rail 42 than is the lift cylinder mount. Indeed, each of lift cylinder mounts 310 can have a width 330 that is 0.9 times or less (e.g., 0.9, 0.8, 0.7, 0.6, 0.5 times or less) of a maximum transverse dimension 334 of cylinder body 286 of the lift cylinder it supports (FIG. 4B). Further, no portion of the lift cylinder mount may be disposed between the cylinder body and the outer rail—and, in some embodiments, the lift cylinder mount can be disposed completely below the cylinder body of the lift cylinder, such that, e.g., no portion of the lift cylinder mount is disposed above a protrusion (e.g., 338, described below) that couples the lift cylinder to the lift cylinder mount.

To mount lift cylinders 78*a*, 78*b* to lift cylinder mounts 310, each of lift cylinders 78*a*, 78*b* can include a protrusion 338 extending from lower end 290 of cylinder body 286, which can be received by an opening 342 of its respective lift cylinder mount (FIG. 4B). For each of lift cylinders 78*a*, 78*b*, protrusion 338 can have a maximum transverse dimension 344 that is less than maximum transverse dimension 334 of cylinder body 286. To illustrate, for each of lift cylinders 78*a*, 78*b*, maximum transverse dimension 344 of protrusion 338 can be less than or equal to any one of, or between any two of, 0.2, 0.3, 0.4, 0.5, 0.6, 0.7, 0.8, or 0.9 times maximum transverse dimension 334 of cylinder body 286. Dimensions described for protrusions 338 are also applicable to openings 342 of lift cylinder mounts 310, as the latter receive the former. In at least this way, lift cylinder mounts 310 need not obstruct the space between cylinder bodies 286 and outer rails 42, facilitating close-spacing of those cylinder bodies to the outer rails. In mast 22, each of lift cylinder mounts 310 comprises a substantially constant thickness 346. More specifically, each of lift cylinder mounts can comprise a plate, and the plate can define opening 342. As shown, lift cylinder mounts 310 can be coupled to brackets 350 that surround fittings 302 of lift cylinders 78*a*, 78*b* coupled to the lift cylinder mounts (FIG. 4B). At least by contacting fittings 302, brackets 350 can limit rotation of lift cylinders 78*a*, 78*b* relative to outer rails 42.

Referring now to FIGS. 10A-11F, shown is an outer mast 38*b*. Outer mast 38*b* can be substantially similar to outer mast 38*a*, with the primary exceptions described below. To begin, outer mast 38*b* can be wider than a distance between portions of material handling vehicle 10 (e.g., along axle 18) to which the outer mast is mounted. For example, a horizontal distance 134 between outermost surfaces of outer rails 42 can be larger than a horizontal distance 366 between outermost surfaces of axle mounts 26*a*, 26*b*. More particularly, horizontal distance 366 can be less than or equal to any one of, or between any two of, 0.95, 0.90, 0.85, or 0.80 times horizontal distance 134. Typically, to bridge such a horizontal gap between a mast's outer rails and its material handling vehicle mounts, multiple-piece mast mounts are used, with, for example, the mast supports moving inboard of the outer rails along consecutive ones of the pieces in a direction toward the material handling vehicle mounts. Such an arrangement, however, not just introduces cost and complexity due to the multiple pieces, it can also give rise to stress concentrations, particularly where the multiple pieces are joined to one another. Further, such multiple-piece mast mounts may be obtrusive, requiring, for example, the mast to be positioned further from the material handling vehicle to avoid interference with other mast components (e.g., lift cylinders thereof) and/or material handling vehicle components, which can undesirably increase the material handling vehicle's front overhang.

Figure 11A:
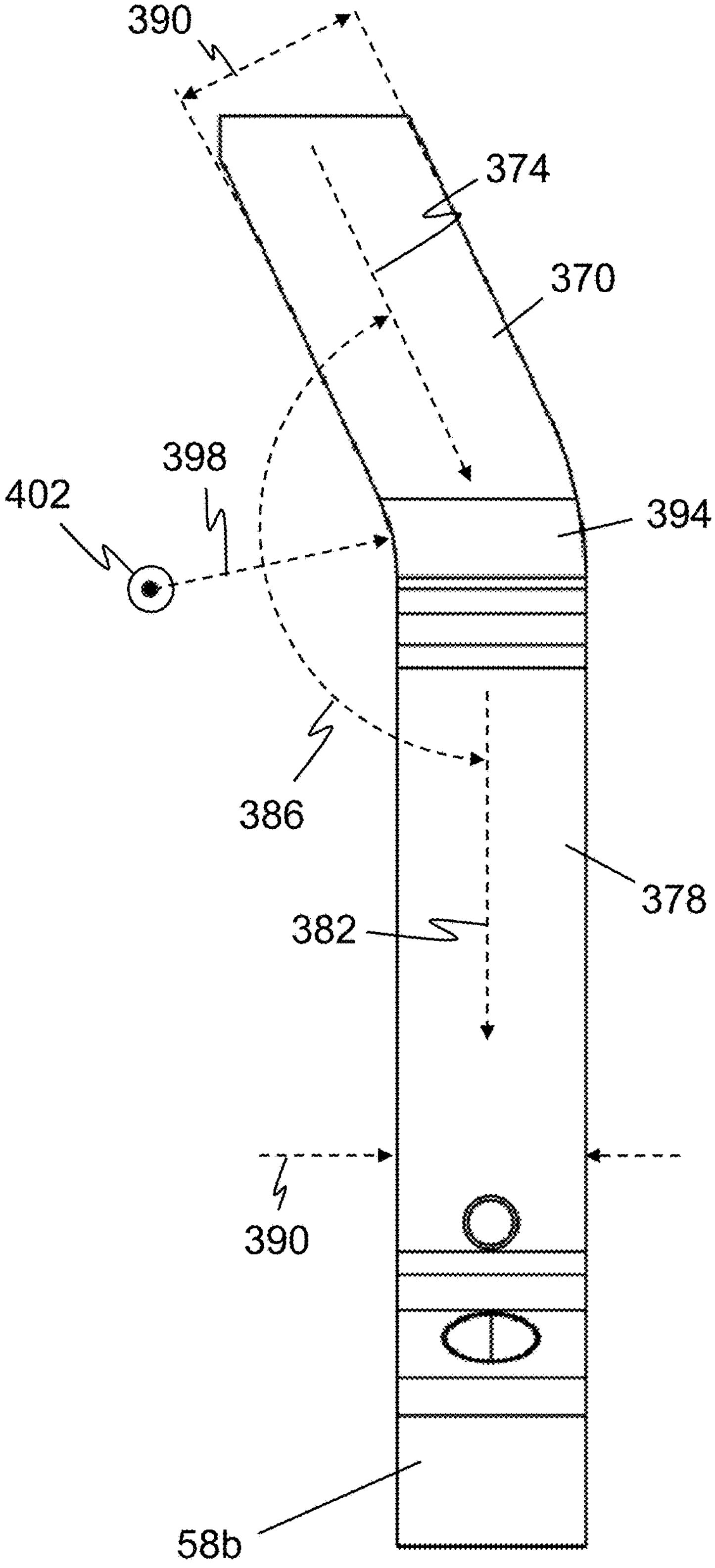
Figure 11B:
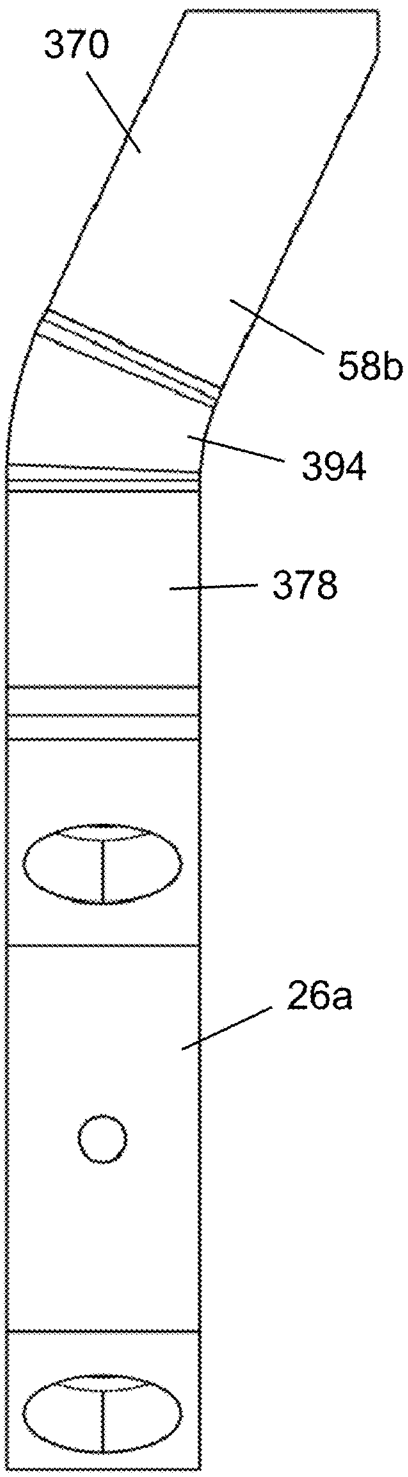
Figure 11C:
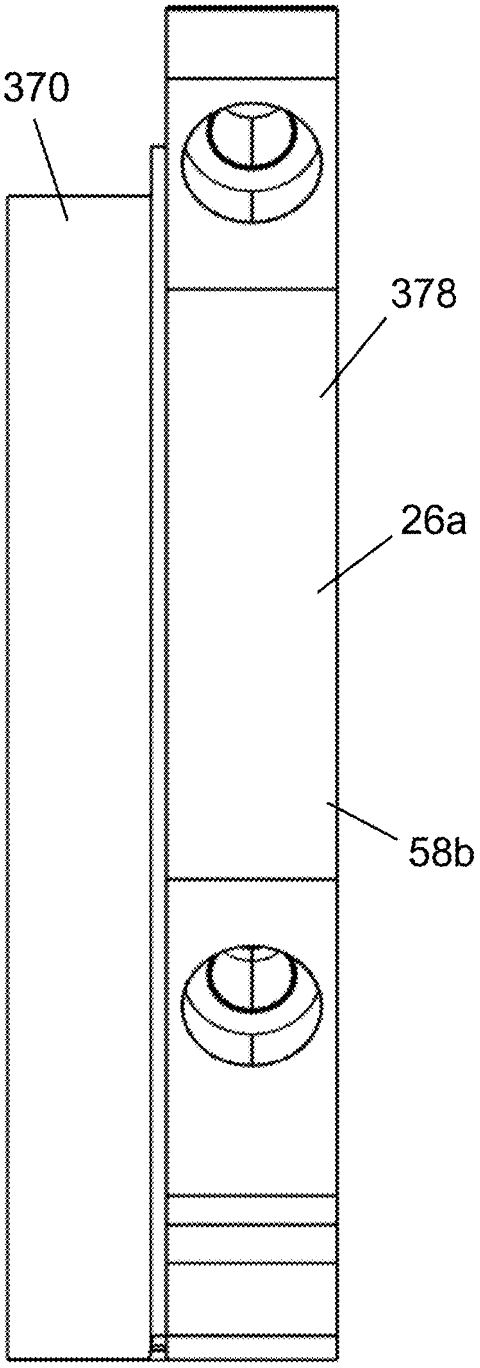
Figure 11D:
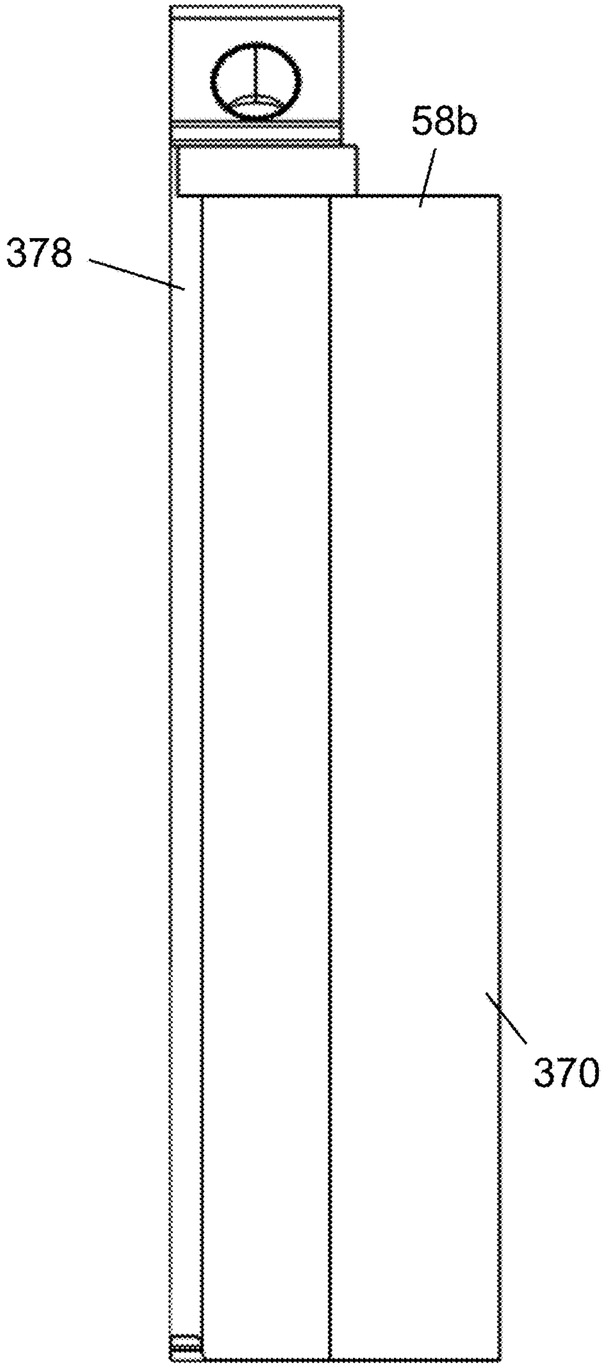

In outer mast 38*b*, each of mast supports 58*b* instead comprises a first portion 370 coupled (e.g., welded) to its outer rail 42 and extending in a direction 374 that is perpendicular to vertical direction 54 and toward the other outer rail 42, and a second portion 378 coupled to the first portion and extending in a direction 382 that is perpendicular to the vertical direction and angularly disposed relative to direction 374. To illustrate, for each of mast supports 58*b*, an angle 386 between directions 374 and 382 (and/or outermost surfaces of first and second portions 370 and 378) can be greater than or equal to any one of, or between any two of: 140, 145, 150, 155, 160, 165, or 170 degrees (e.g., between 145 and 165 degrees) (FIG. 11A). Second portions 378 can each define one of axle mount portions 26*a*, and directions 382 of the second portions can be parallel to one another. Thus, mast supports 58*b*, via their first portions 370, can span the horizontal gap between outer rails 42 and mounts (e.g., 26*a*, 26*b*) for coupling the outer rails to material handling vehicle 10 and, via their second portions 378, mount the outer rails to the material handling vehicle.

Each of mast supports 58*b* may not include braces, plates, gussets, or other structures for joining first portion 370 to its outer rail 42 and/or second portion 378 to first portion 370. Further, mast supports 58*b* each may not extend horizontally outboard of the outermost surface 126 of outer rail 42 to which it is coupled. Such can be facilitated by the angularly disposed nature of first and second portions 370 and 378, which may better resist buckling and/or bending loads applied to the mast supports. Like outer mast 38*a*, outer mast 38*b* can include a brace 318 extending between outer rails 42 at lower end 46 of the outer mast to which mast supports 58*b* can be coupled (e.g., welded), further promoting the load-bearing capabilities of the mast supports.

For each of mast supports 58*b*, first and second portions 370, 378 can have a maximum thickness 390 that is greater than or equal to any one of, or between any two of: 2.0, 2.5, 3.0, 3.5, 4.0, 4.5, or 5 cm (e.g., between 2.5 and 4.5 cm). Further, each of first and second portions 370, 378 can have a substantially constant thickness 390; to illustrate, the first and second portions can each be defined by a plate, whether separate plates for the first and second portions (where thicknesses 390 of the first and second portions may or may not differ) or a single plate that defines both (where thicknesses 390 of the first and second portions may be the same). In either instance, maximum thickness 390 can be the same between first and second portions 370, 378, and/or the mast support can comprise a substantially constant thickness 390.

For each of mast supports 58*b*, first and second portions 370, 378 can be unitary with one another, such as formed from a single piece of material. To illustrate, mast supports 58*b* can each include a plate that defines its first and second portions 370, 378, where the plate includes a bent portion 394 disposed between the first and second portions. To illustrate, a radius 398 of bent portion 394 (FIG. 11A) can be greater than or equal to any one of, or between any two of: 2.0, 2.5, 3.0, 3.5, 4.0, 4.5, or 5.0 cm. And a bend axis 402 of bent portion 394 (e.g., about which angle 386 is measured) can be parallel to vertical direction 54. Such construction can provide several advantages, such as guarding against incomplete joining of first and second portions 370, 378 as well as weakening of the first and second portions that might otherwise occur during joining of the two (e.g., due to heat if they are welded to one another). Nevertheless, in some embodiments, mast supports 58*b* can include first and second portions 370, 378 that are welded to one another.

Figure 12A:
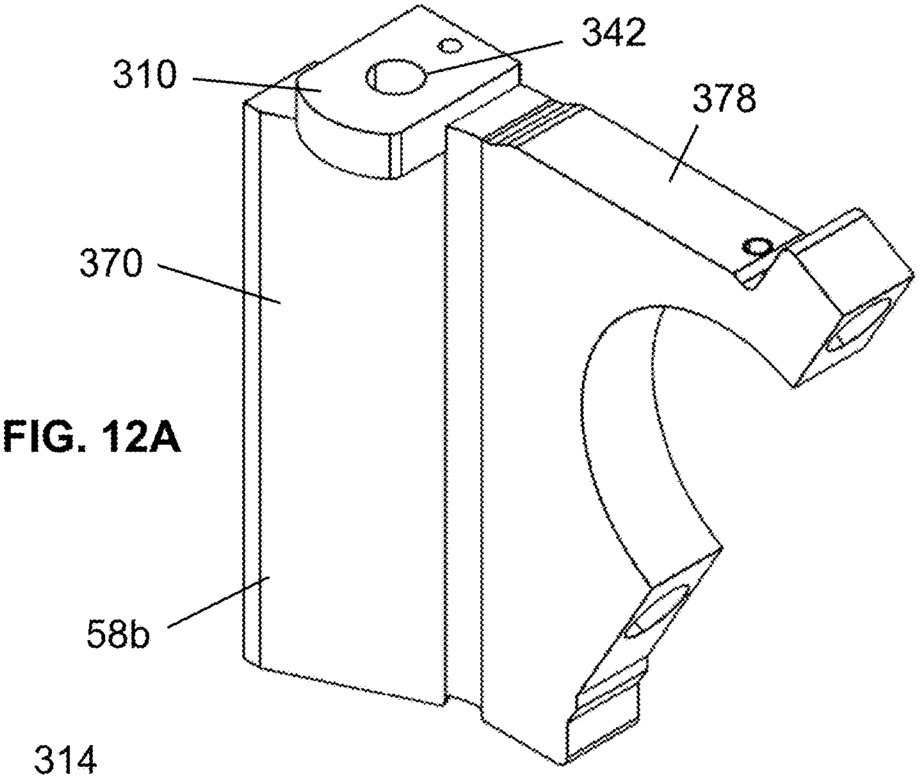
FIG. 12A is a perspective view of one of the mast mounts of FIG. 10A coupled to a lift cylinder mount.
Figure 12B:
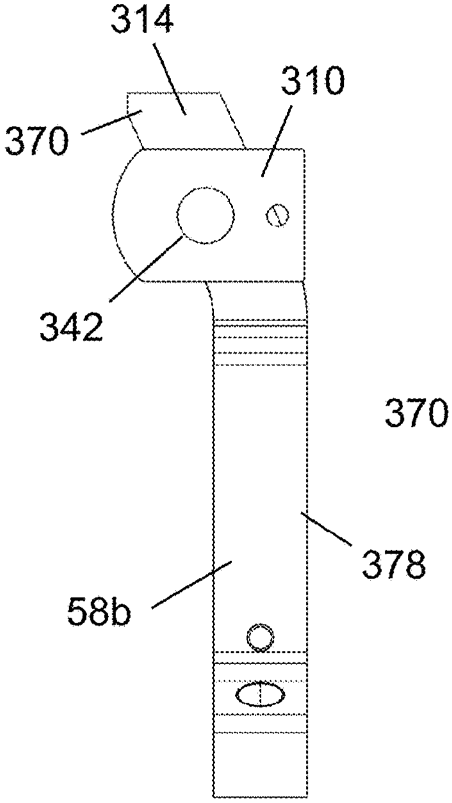
FIGS. 12B and 12C are top and left side views, respectively, of the mast mount and lift cylinder mount of FIG. 12A.
Figure 12C:
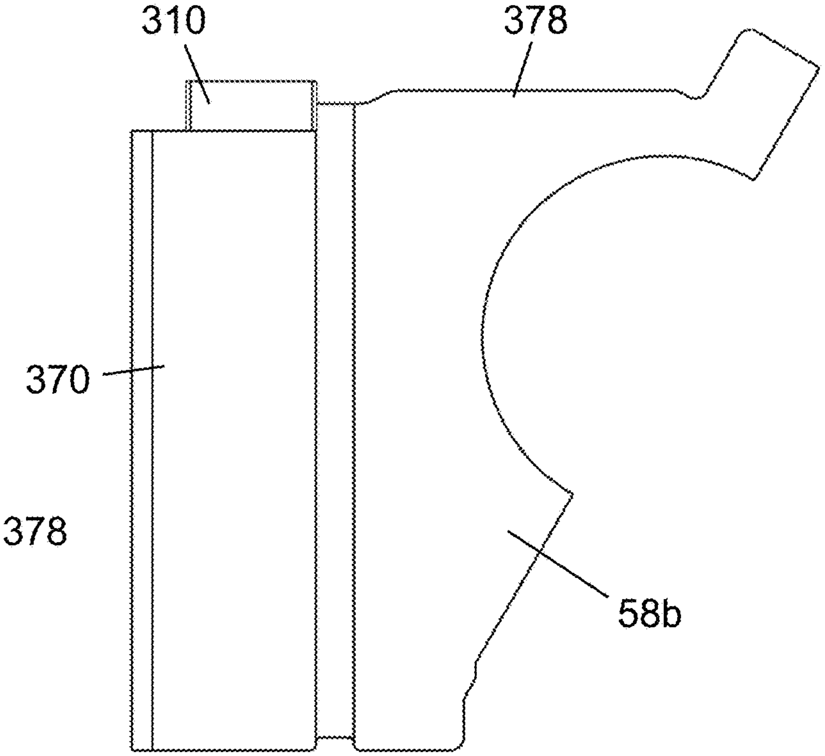

Turning to FIGS. 12A-12C, like mast supports 58*a*, mast supports 58*b* can each support a lift cylinder mount 310 via an upper surface 314 of the mast support. In particular, each of mast supports 58*b* can be coupled (e.g., welded) to a lift cylinder mount 310 along upper surface 314 thereof, specifically, along the upper surface of first portion 370. At least via the mast support's angularly disposed first and second portions 370, 378, and in some embodiments, bent portion 394 that joins the two, mast support 58*b* can provide enhanced support to the lift cylinder mount and the lift cylinder mounted thereto, such as by resisting buckling loads that might be caused by the lift cylinder acting on the mast support as the lift cylinder lifts the inner mast(s) (e.g., 70*a*-70*c*). And mast support 58*b*—like mast support 58*a*—may not include braces, plates, gussets, or other structures for joining the mast support to its outer rail 42, facilitating close-placement of the lift cylinder supported thereon to the outer rail and thus reduced front overhang of material handling vehicle 10 as described above.

Some of the present methods for assembling a mast (e.g., 22) of a material handling vehicle (e.g., 10) comprise forming a mast support (e.g., 58*b*) for coupling an outer rail (e.g., 42) of the mast to the material handling vehicle at least by bending a plate such that a bent portion (e.g., 394) of the plate separates a first portion (e.g., 370) of the plate that extends in a direction (e.g., 374) and a second portion of the plate extends in a direction (e.g., 382) that is angularly disposed relative to the direction in which the first portion extends, where the second portion of the plate defines a portion of an axle mount (e.g., 26*a*), and coupling the first portion of the plate to the outer rail, the outer rail extending in a direction (e.g., 54) that is perpendicular to each of the directions in which the first and second portions extend.

In some methods, an angle (e.g., 386) between the directions in which the first and second portions extend is between 145 and 165 degrees. In some methods, a bend radius (e.g., 398) of the bent portion is between 2 and 4 cm. In some methods, the plate has a thickness (e.g., 390) that is between 2.5 and 4.5 cm, which can be substantially constant along the plate. In some methods, coupling of the first portion of the plate to the mast rail comprises welding the first portion to the mast rail. Some methods comprise welding a lift cylinder mount (e.g., 310) to an upper surface (e.g., 314) of the first portion of the plate. Some methods comprise coupling the portion of the axle mount to an axle (e.g., 18) of the material handling vehicle.

Figure 13:
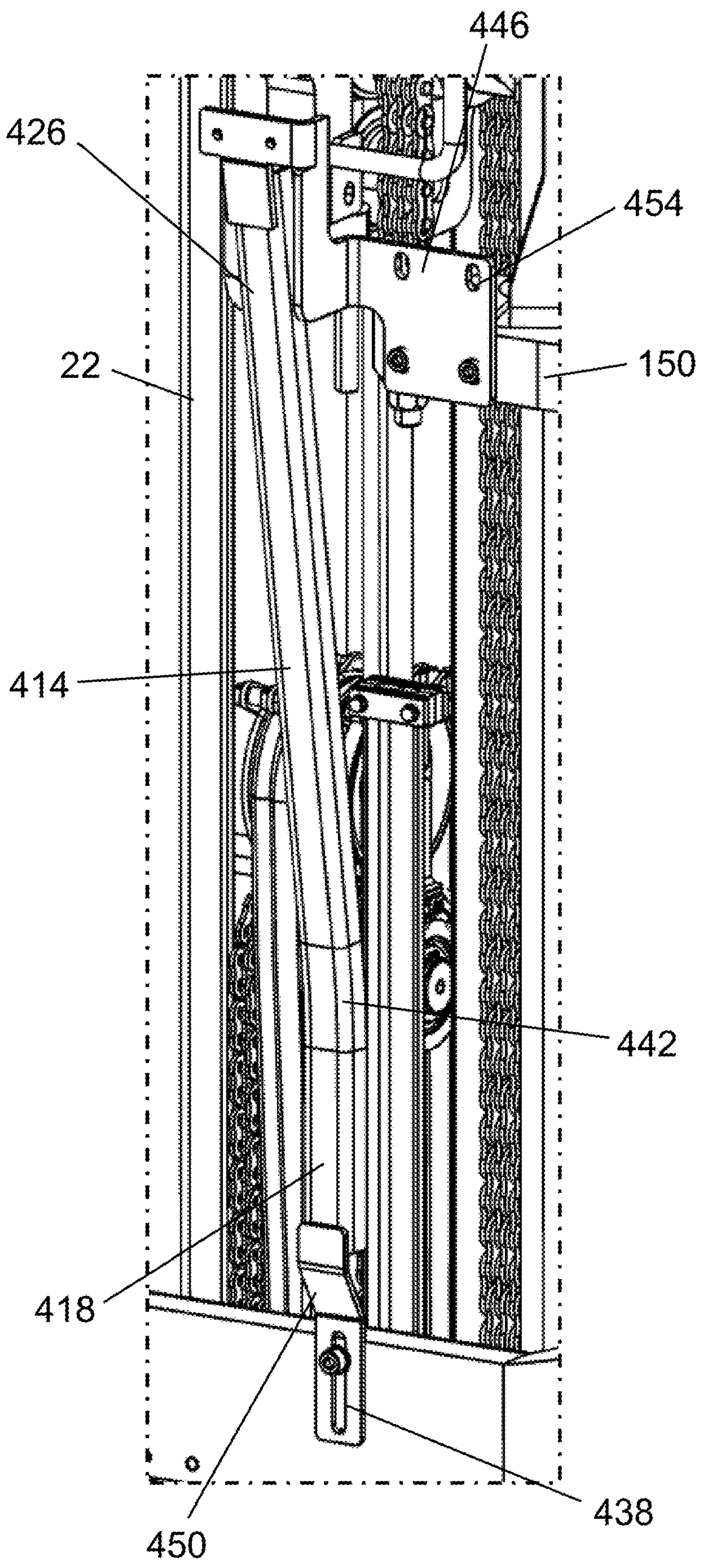
FIG. 13 is a perspective view of the mast of FIG. 2A, showing a hose support configured to support one or more hydraulic hoses.
Figure 14A:
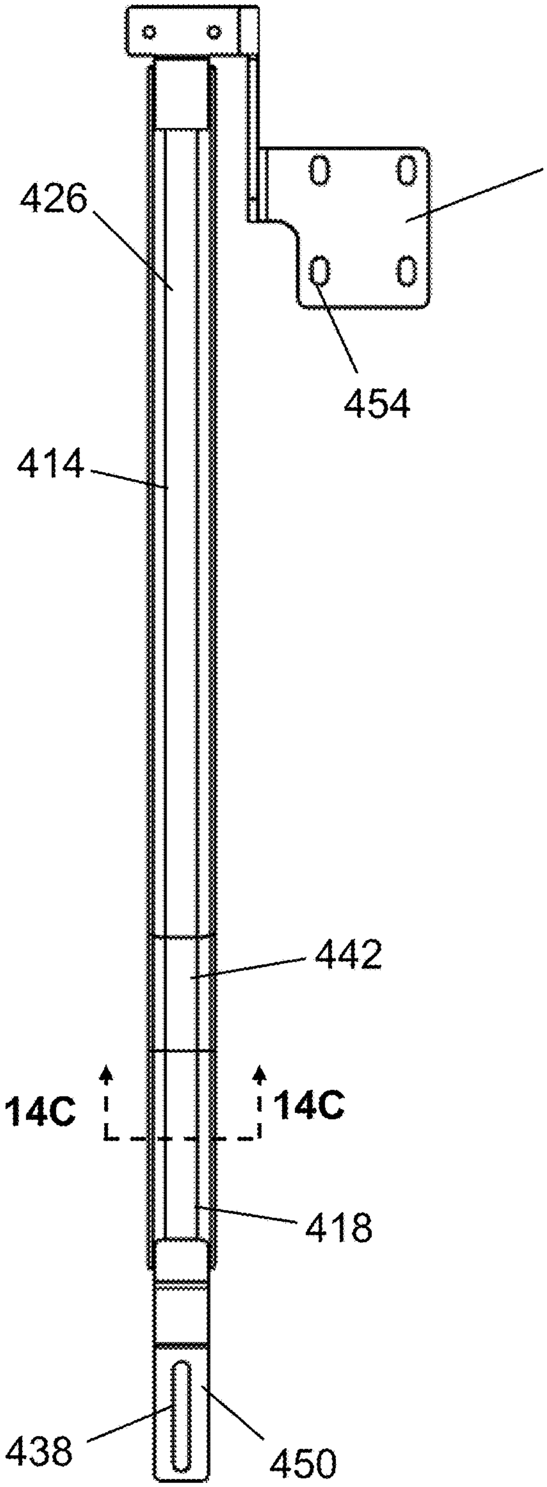
FIGS. 14A and 14B are rear and front views, respectively, of the hose support of FIG. 13.
Figure 14B:
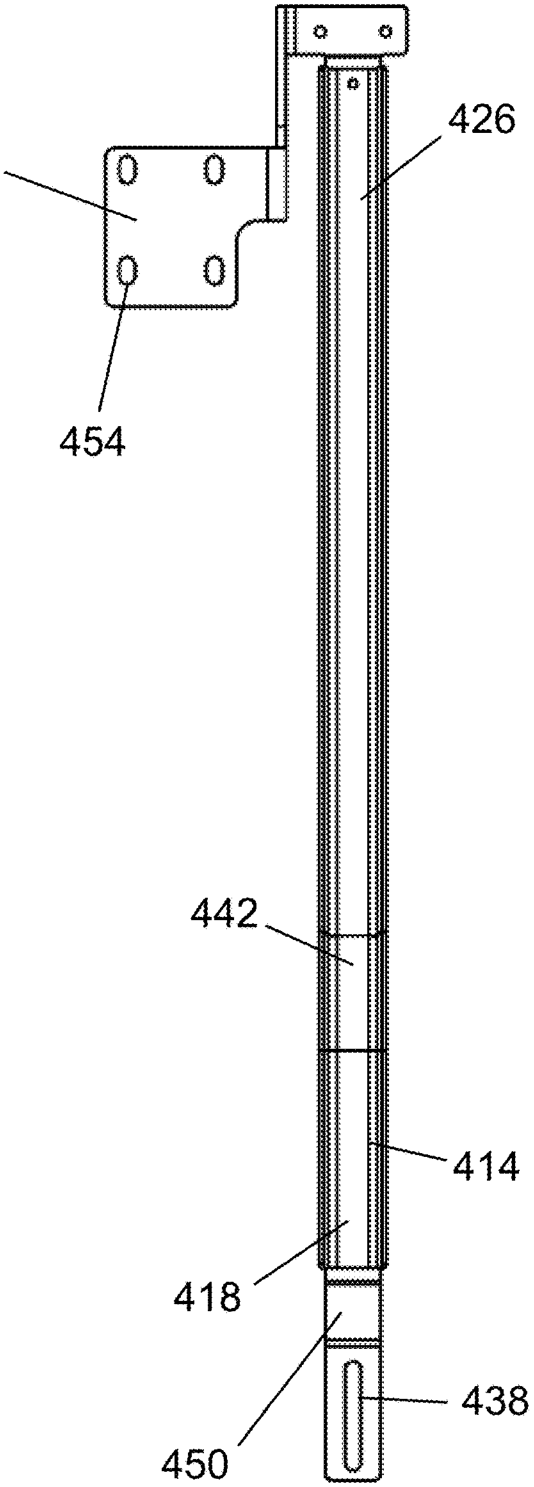
Figure 14C:
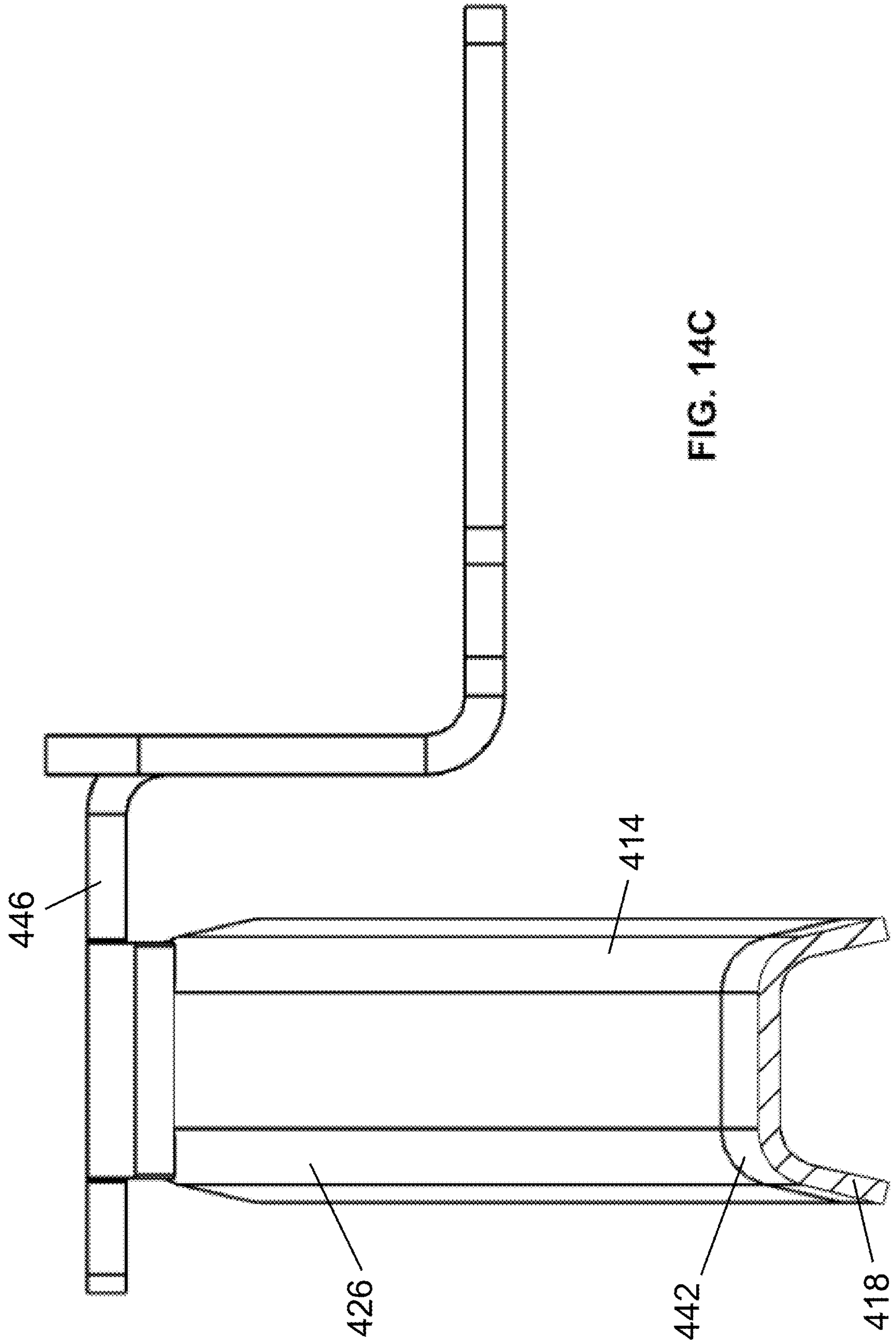
FIG. 14C is a cross-sectional bottom view of the hose support of FIG. 13, taken along line 14C-14C of FIG. 14A.
Figure 14D:
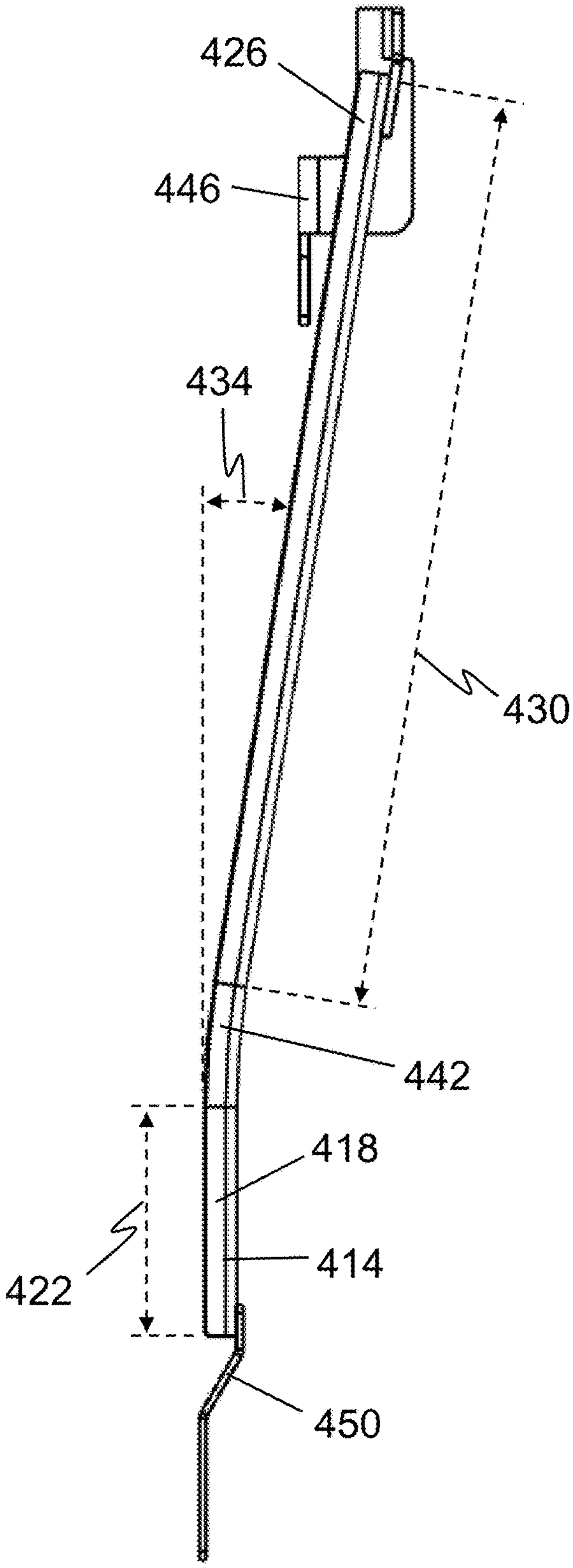
FIGS. 14D-14G are left side, right side, top, and bottom views, respectively, of the hose support of FIG. 13.
Figure 14E:
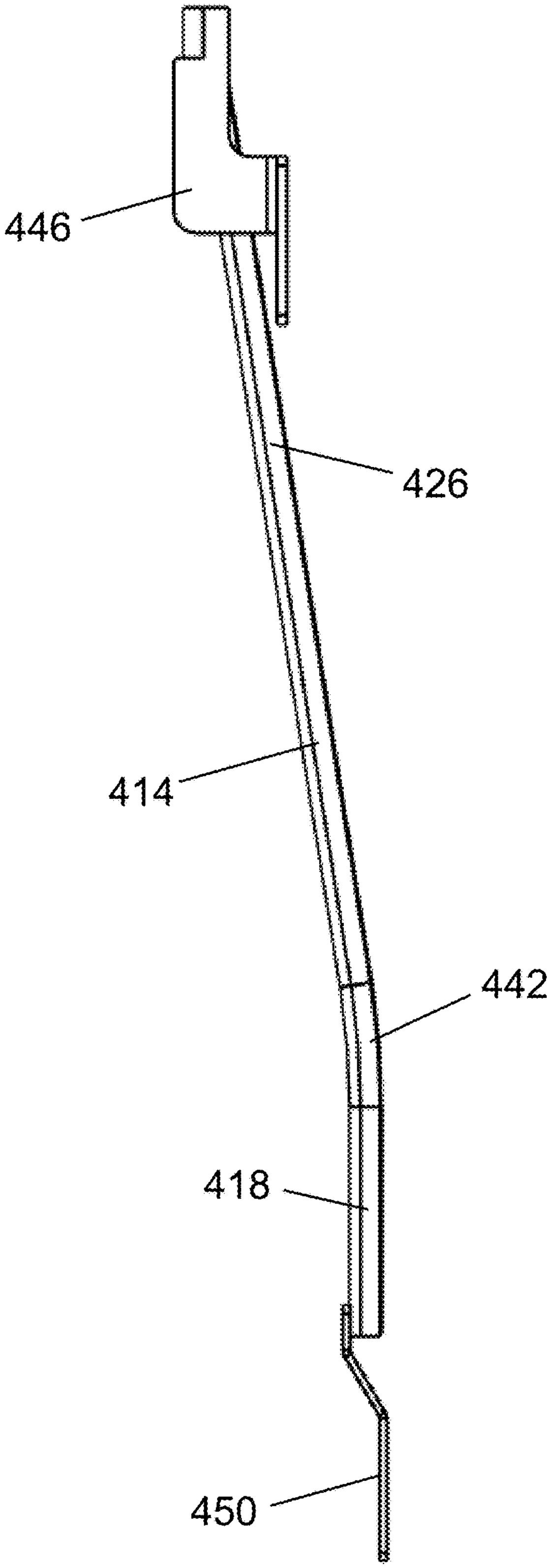
Figure 14F:
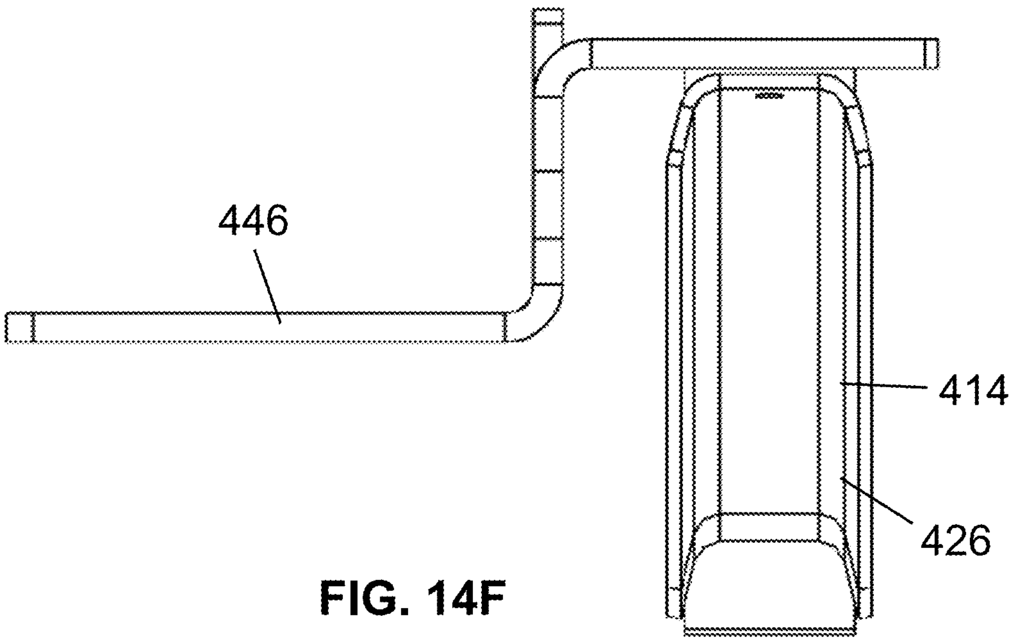
Figure 14G:
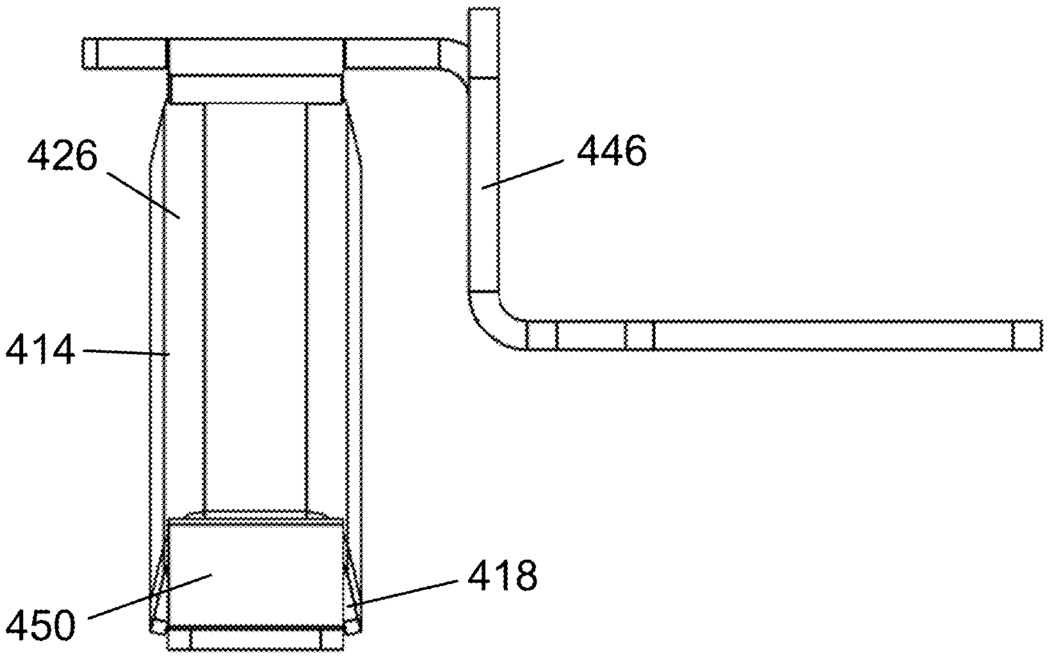

Referring now to FIGS. 13-14G, some of the present masts (e.g., 22) can have varying heights, and coupling components to those masts traditionally requires components of correspondingly varying heights. In some instances, two or more of the masts of varying heights can each include a hose support 414 to secure hoses to those masts.

Hose support 414 can include a lower linear portion 418 having a length 422 and an upper linear portion 426 having a length 430, which can be larger than the length of the lower linear portion (FIG. 14D). For example, upper linear portion

426 may have a length 430 that is at least, at most, exactly, or between any two of 2, 3, 4, 5, or 6 times larger than a length 422 of lower linear portion 418. In some instances, each of upper linear portion 426 and lower linear portion 418 can define a channel to receive one or more hoses (FIG. 14C).

Upper linear portion 426 of hose support 414 can be angularly disposed relative to lower linear portion 418 by an angle 434 that is at least 5 degrees (e.g., at least, at most, exactly, or between any two of 5, 6, 7, 8, 9, 10, 11, 12, 13, 14, 15, 16, 17, 18, 19, and 20 degrees). Angle 434 between upper linear portion 426 and lower linear portion 418 can be substantially maintained between hose supports for masts of different heights. When angle 434 between upper linear portion 426 and lower linear portion 418 is substantially maintained, each of the hose supports can be joined to its respective mast at its upper linear portion by substantially the same bracket (e.g., upper bracket 446). Likewise, the hose support can be joined to its respective mast at its lower linear portion 418 via a slot 438 (e.g., of lower bracket 450) coupled to its lower linear portion. In some instances, the hose support can have its lower linear portion 418 cut to length 422 before it is joined to its respective mast. In at least these ways, the number of components needed to support hoses relative to masts of various heights is reduced, and assembly of masts can be simplified.

Hose support 414 can also include a bent portion 442 to further simplify mast assembly. Upper linear portion 426 and lower linear portion 418 can be joined by bent portion 442. Bent portion 442 can define angle 434 between upper linear portion 426 and lower linear portion 418 that is substantially maintained between hose supports for masts of different heights. Bent portion 442 can be unitary with upper linear portion 426 and lower linear portion 418. This is advantageous because hose supports for masts of varying lengths can be manufactured using a same component, rather than as multiple components that must be coupled (e.g., welded) together.

Hose supports 414 can facilitate adjustability of hose support attachment to the mast. To illustrate, hose support 414 can further include an upper bracket 446 and a lower bracket 450, where each of the upper bracket and the lower bracket can be coupled (e.g., welded) to upper linear portion 426 and lower linear portion 418, respectively. For example, upper bracket 446 can be coupled (e.g., welded) to upper linear portion 426 of hose support 414, while lower bracket 450 can be coupled (e.g., welded) to lower linear portion 418 of the hose support. At least one of upper and lower brackets, 446, 450, can couple hose support 414 to a mast (e.g., 22) of a material handing vehicle (e.g., 10). For example, upper bracket 446 can couple upper linear portion 426 to the mast, while lower bracket 450 can couple lower linear portion 418 to the mast. Lower bracket 450 and/or upper bracket 446 can each define a slot 438 extending in a direction that is parallel to length 422 of lower linear portion 418. Additionally, or alternatively, lower bracket 450 and/or upper bracket 446 can each define openings 454 spaced apart from one another in that direction. In some configurations, lower bracket 450 can define at least one of the slot(s) 438, while upper bracket 446 can define at least some of openings 454. Each of slot(s) 438 and/or openings 454 defined by lower bracket 450 and/or upper bracket 446 can receive a fastener. By selecting which opening(s) 454 receive a fastener, and/or by positioning a fastener relative to slot 438, the position at which hose support 414 is coupled to the mast can be adjusted. In at least this way, the same hose support 414 can advantageously be utilized with masts of various heights.

Also disclosed herein, in some aspects, are methods of assembling masts of material handling vehicles including one or more hose supports. The one or more hose supports can be used to secure hoses to masts of varying heights. To illustrate, in some instances, a first hose support (e.g., hose support 114) is coupled to a first mast having a first height. Coupling between the first hose support and the first mast can be between an upper portion of the first mast and a lower portion of the first mast that is positioned below the upper portion of the first mast. Coupling between the first hose support and the upper portion of the first mast can be between an upper linear portion (e.g., upper linear portion 426) of the first hose support and the upper portion of the first mast, while coupling between the first hose support and the lower portion of the first mast can be between a lower linear portion (e.g., lower linear portion 418) of the first hose support and the lower portion of the first mast. In some instances, for each of the first and second hose supports, the upper and lower linear portions each define a channel that can receive one or more hoses to be secured to the masts.

In some instances, a second hose support can be coupled to a second mast having a second height. Coupling between the second hose support and the second mast can be between an upper portion of a second mast and a lower portion of the second mast that is positioned below the upper portion of the second mast. Coupling between the second hose support and the upper portion of the second mast can be between an upper linear portion (e.g., upper linear portion 426) of the second hose support and the upper portion of the second mast, while coupling between the second hose support and the lower portion of the second mast can be between a lower linear portion (e.g., lower linear portion 418) of the second hose support and the lower portion of the second mast.

The upper linear portion and the lower linear portion of the first hose support can be angularly disposed relative to one another by a first angle that is at least 5 degrees (e.g., at least, at most, exactly, or between any two of 5, 6, 7, 8, 9, 10, 11, 12, 13, 14, 15, 16, 17, 18, 19, and 20 degrees). The upper linear portion and the lower linear portion of the second hose support can be angularly disposed relative to one another by a second angle that is the same as the first angle (e.g., at least, at most, exactly, or between any two of 5, 6, 7, 8, 9, 10, 11, 12, 13, 14, 15, 16, 17, 18, 19, and 20 degrees) about which the upper linear portion and the lower linear portion of the first hose support are angularly disposed relative to one another. The angle about which the upper linear portion and the lower linear portion of the first and second hose supports are disposed can be defined by a bent portion (e.g., bent portion 442) that joins the upper linear portion of each of the first and second hose supports to the lower linear portion of each of the first and second hose supports to further simplify mast assembly. The bent portion can be unitary with the upper linear portion and lower linear portion of each of the first and second hose supports.

In some instances, the upper linear portions of the first and second hose supports can be the same length. By comparison, the lower linear portion of the first hose support can be adjusted (e.g., cut) to a different length than the lower linear portion of the second hose support, or the lower linear portion of the second hose support can be adjusted (e.g., cut) to a different length than the lower linear portion of the first hose support. In at least this way, the first and second hose supports can together advantageously accommodate masts of varying heights. To illustrate, a length of the lower linear portion of a first hose support used to secure one or more hoses to a first mast having a first height can be at least 10% larger (e.g., at least, at most, exactly, or between any two of 10, 11, 12, 13, 14, 15, 16, 17, 18, 19, or 20% larger) than a length of a lower linear portion of a second hose support used to secure one or more hoses to a second mast having a second height that is less than the height of the first mast. The length of the lower linear portion of the second hose support depends on the height of the second mast, and the lower linear portion of the second hose support can be cut to its length based on the height of the second mast. Cutting the lower linear portion of the second hose support can occur after the lower linear portion of the second hose support is angularly disposed relative to the upper linear portion of the second hose support.

Adjustability of the first hose support or second hose support relative to mast height can also be accomplished by coupling the first and second hose supports to the first and second masts using slot(s) (e.g., slot(s) 438) or openings (e.g., openings 454) defined by one or more brackets (e.g., upper bracket 446 and lower bracket 450) of the first and second hose supports. Because the angle between the upper linear portion and the lower linear portion of each of the first and second hose supports can be substantially maintained between hose supports for masts of different heights, the first and second hose supports can be joined to the first and second masts by substantially the same upper brackets and/or lower brackets.

Coupling between the first hose support and the first mast and between the second hose support and the second mast can be accomplished by disposing a fastener through slot(s) or openings defined by one or more brackets of the first and second hose supports. As an example, a fastener can be disposed through a slot defined by a first bracket of the first hose support to couple the first hose support to the first mast. Similarly, a fastener can be disposed through a slot defined by a first bracket of the second hose support to couple the second hose support to the second mast. In some instances, the first bracket of the first hose support and the first bracket of the second hose support are substantially same. In other instances, the first bracket of the first hose support and the first bracket of the second hose support are different.

Additionally, or alternatively, coupling between the first hose support and the first mast and between the second hose support and the second mast can be accomplished by disposing a fastener through one of one or more openings defined by one or more brackets of the first and second hose supports. As an example, a fastener can be disposed through an opening defined by a second bracket of the first hose support to couple the first hose support to the first mast. Similarly, a fastener can be disposed through an opening defined by a second bracket of the second hose support to couple the second hose support to the second mast. In some instances, ones of the openings are spaced from one another in a direction that is parallel to the length of the lower linear portion. In some instances, the second bracket of the first hose support and the second bracket of the second hose support are substantially the same. In other instances, the second bracket of the first hose support and the second bracket of the second hose support are different.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A hose support for a mast of a material handling vehicle, the hose support comprising:

a lower linear portion having a length; and an upper linear portion having a length that is larger than the length of the lower linear portion, the upper linear portion being angularly disposed relative to the lower linear portion by an angle of at least 5 degrees;

a lower bracket configured to couple the lower linear portion to a mast of a material handling vehicle; and an upper bracket configured to couple the upper linear portion to the mast;

wherein the lower bracket and/or the upper bracket each define a slot extending in a first direction that is parallel to the length of the lower linear portion and/or openings spaced apart from one another in the first direction, each of the slot(s) and/or openings configured to receive a fastener for coupling the hose support to the mast.

2. The hose support of claim 1, wherein the lower bracket defines at least one of the slot(s).

3. The hose support of claim 1, wherein the upper bracket defines at least some of the openings.

4. The hose support of claim 1, wherein the angle is between 5 and 20 degrees.

5. The hose support of claim 1, wherein the hose support comprises a bent portion joining the lower linear portion to the upper linear portion.

6. The hose support of claim 5, wherein the bent portion is not welded to either the upper linear portion or the lower linear portion.

7. The hose support of claim 1, wherein each of the lower linear portion and the upper linear portion defines a channel configured to receive one or more hoses.

8. The hose support of claim 1, wherein:

the upper bracket is welded to the upper portion; and the lower bracket is welded to the lower portion.

9. A method for assembling masts of material handling vehicles, the method comprising:

coupling a first hose support to an upper portion of a first mast and a lower portion of the first mast that is positioned below the upper portion of the first mast, the coupling such that the first hose support includes an upper linear portion coupled to the upper portion of the first mast and a lower linear portion coupled to the lower portion of the first mast, the upper linear portion and the lower linear portion of the first hose support being angularly disposed relative to one another by a first angle; and coupling a second hose support to an upper portion of a second mast and a lower portion of the second mast that is positioned below the upper portion of the second mast, the coupling such that the second hose support includes an upper linear portion coupled to the upper portion of the second mast and a lower linear portion coupled to the lower portion of the second mast, the upper linear portion and the lower linear portion of the second hose support being angularly disposed relative to one another by a second angle that is the same as the first angle;

wherein a length of the lower linear portion of the first hose support is at least 10% larger than a length of the lower linear portion of the second hose support.

10. The method of claim 9, wherein the upper linear portions of the first and second hose supports comprise the same length.

11. The method of claim 9, comprising cutting the lower linear portion of the second hose support to its length after the lower linear portion of the second hose support is angularly disposed relative to the upper linear portion of the second hose support.

12. The method of claim 9, wherein each of the first and second angles is between 5 and 20 degrees.

13. The method of claim 9, wherein coupling the first hose support to the first mast and coupling the second hose support to the second mast each comprise disposing a fastener through a slot defined by a first bracket of the respective hose support.

14. The method of claim 13, wherein the first bracket of the first hose support and the first bracket of the second hose support are identical.

15. The method of claim 9, wherein coupling the first hose support to the first mast and coupling the second hose support to the second mast each comprise disposing a fastener through one or more openings defined by a second bracket of the respective hose support, the openings being spaced from one another in a direction that is parallel to the length of the lower linear portion.

16. The method of claim 15, wherein the second bracket of the first hose support and the second bracket of the second hose support are identical.

17. The method of claim 9, wherein each of the first and second hose supports comprises a bent portion joining the upper linear portion to the lower linear portion.

18. The method of claim 17, wherein, for each of the first and second hose supports, the bent portion is not welded to either the upper linear portion or the lower linear portion.

19. The method of claim 9, wherein, for each of the first and second hose supports, the upper and lower linear portions each define a channel configured to receive one or more hoses.

* * * * *